United States Patent
Li et al.

(10) Patent No.: US 10,750,489 B2
(45) Date of Patent: *Aug. 18, 2020

(54) SIGNALING FOR MULTIPLEXING OF LOW LATENCY COMMUNICATION AND SIDELINK COMMUNICATIONS

(71) Applicant: QUALCOMM Incorporated, San Diego, CA (US)

(72) Inventors: Chong Li, Weehawken, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/224,331

(22) Filed: Dec. 18, 2018

(65) Prior Publication Data

US 2019/0124634 A1 Apr. 25, 2019

Related U.S. Application Data

(63) Continuation of application No. 15/711,751, filed on Sep. 21, 2017, now Pat. No. 10,244,522.

(Continued)

(51) Int. Cl.
*H04W 72/04* (2009.01)
*H04L 5/00* (2006.01)
(Continued)

(52) U.S. Cl.
CPC .......... *H04W 72/042* (2013.01); *H04L 1/00* (2013.01); *H04L 1/18* (2013.01); *H04L 5/0055* (2013.01);
(Continued)

(58) Field of Classification Search
CPC .......... H04W 72/042; H04W 72/0446; H04W 726/14; H04W 76/023; H04W 4/70;
(Continued)

(56) References Cited

U.S. PATENT DOCUMENTS 9,634,985 B2    4/2017  Haggar et al.
9,930,678 B2    3/2018  Kumar et al.
(Continued)

FOREIGN PATENT DOCUMENTS

WO   WO-2014015266        1/2014
WO   WO-2015179134 A1    11/2015
(Continued)

OTHER PUBLICATIONS

CATT: "NR Frame Structure Design", 3GPP Draft; R1-166472, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22-26, 2016, Aug. 13, 2016 (Aug. 13, 2016), pp. 1-8, XP051142412, Retrieved from the Internet: URL: http://www.3gpp.org/ftp/tsg_ran/WG1_RL1/TSGR1_86/Docs/ [retrieved on Aug. 13, 2016] the whole document.

(Continued)

*Primary Examiner* — Phong La
(74) *Attorney, Agent, or Firm* — Holland & Hart LLP

(57) ABSTRACT

Methods, systems, and devices for wireless communication are described. In an FDD system, a UE may identify an indicator associated with ultra-reliable low latency communications (URLLC) while communicating in a sidelink channel. The UE may also identify dedicated uplink resources in the sidelink channel, and reserve the dedicated uplink resources. The dedicated uplink resources may be reserved for an acknowledgement/negative acknowledgement (ACK/NACK) feedback or for a scheduling request (SR). URLLC (Continued)

data may be communicated, and the reserved uplink resources may be utilized to transmit an ACK/NACK feedback or a SR. In a TDD system, a base station may transmit information identifying dedicated resources for URLLC data. In some cases, a base station may transmit an indicator channel, which a sidelink UE may monitor to determine the presence of URLLC data, and respond accordingly.

16 Claims, 20 Drawing Sheets

Related U.S. Application Data

(60) Provisional application No. 62/466,839, filed on Mar. 3, 2017, provisional application No. 62/469,416, filed on Mar. 9, 2017.

(51) Int. Cl.
| | | |
|---|---|---|
| H04W 76/14 | (2018.01) | |
| H04L 1/18 | (2006.01) | |
| H04L 5/14 | (2006.01) | |
| H04W 88/04 | (2009.01) | |
| H04L 1/00 | (2006.01) | |
| H04W 8/00 | (2009.01) | |
| H04W 48/12 | (2009.01) | |
| H04W 4/70 | (2018.01) | |

(52) U.S. Cl.
CPC ........... *H04L 5/14* (2013.01); *H04W 72/0446* (2013.01); *H04W 76/14* (2018.02); *H04W 88/04* (2013.01); *H04W 4/70* (2018.02); *H04W 8/005* (2013.01); *H04W 48/12* (2013.01)

(58) Field of Classification Search
CPC ........ H04W 8/005; H04W 48/12; H04L 5/14; H04L 5/0055
USPC ........................................................ 370/329
See application file for complete search history.

(56) References Cited

U.S. PATENT DOCUMENTS

| | | |
|---|---|---|
| 2007/0242764 A1 | 10/2007 | Anigstein et al. |
| 2008/0198902 A1 | 8/2008 | Malladi |
| 2013/0003678 A1 | 1/2013 | Quan et al. |
| 2013/0114401 A1 | 5/2013 | Martin et al. |
| 2014/0133436 A1 | 5/2014 | Shiizaki et al. |
| 2015/0049740 A1 | 2/2015 | Lee et al. |
| 2015/0106420 A1 | 4/2015 | Warfield et al. |
| 2015/0110060 A1 | 4/2015 | Yan et al. |
| 2015/0215842 A1 | 7/2015 | Lim et al. |
| 2015/0282243 A1 | 10/2015 | Lei et al. |
| 2015/0312836 A1 | 10/2015 | Fukuta et al. |
| 2015/0319796 A1 | 11/2015 | Lu et al. |
| 2016/0020891 A1 | 1/2016 | Jung et al. |
| 2016/0119920 A1 | 4/2016 | Mallik et al. |
| 2016/0127997 A1 | 5/2016 | Ang et al. |
| 2016/0277256 A1 | 9/2016 | Mismar et al. |
| 2016/0360550 A1 | 12/2016 | Chen et al. |
| 2017/0019886 A1* | 1/2017 | Patel ....................... H04W 4/70 |
| 2017/0127415 A1* | 5/2017 | Chien ................... H04L 5/0044 |
| 2017/0127433 A1 | 5/2017 | Lin |
| 2017/0171850 A1 | 6/2017 | Ang et al. |
| 2017/0195029 A1 | 7/2017 | Nammi et al. |
| 2017/0201968 A1 | 7/2017 | Nam et al. |
| 2017/0208477 A1 | 7/2017 | Hampel et al. |
| 2017/0223687 A1* | 8/2017 | Kuchibhotla ....... H04W 72/044 |
| 2017/0223695 A1 | 8/2017 | Kwak et al. |
| 2017/0230918 A1 | 8/2017 | Ryu et al. |
| 2017/0245313 A1 | 8/2017 | Kim et al. |
| 2017/0285130 A1 | 10/2017 | Kim et al. |
| 2017/0288817 A1 | 10/2017 | Cao et al. |
| 2017/0325164 A1 | 11/2017 | Lee et al. |
| 2017/0325190 A1 | 11/2017 | Lee et al. |
| 2017/0332358 A1 | 11/2017 | Park et al. |
| 2017/0332359 A1 | 11/2017 | Tsai et al. |
| 2017/0332377 A1 | 11/2017 | Tseng et al. |
| 2017/0339511 A1 | 11/2017 | Lee et al. |
| 2017/0339670 A1 | 11/2017 | Chae et al. |
| 2018/0077718 A1* | 3/2018 | Nory ..................... H04L 5/0007 |
| 2018/0159668 A1 | 6/2018 | Phuyal et al. |
| 2018/0242190 A1* | 8/2018 | Khoryaev ......... H04W 28/0284 |
| 2018/0255532 A1 | 9/2018 | Li et al. |

FOREIGN PATENT DOCUMENTS

| | | |
|---|---|---|
| WO | WO-2016073081 A1 | 5/2016 |
| WO | WO-2016126398 A1 | 8/2016 |
| WO | WO-2016130175 A1 | 8/2016 |
| WO | WO-2016153548 A1 | 9/2016 |
| WO | WO-2016182533 A1 | 11/2016 |
| WO | WO-2018031638 A1 | 2/2018 |

OTHER PUBLICATIONS

International Search Report and Written Opinion—PCT/US2018/018560—ISA/EPO—dated May 22, 2018 (172888WO).

\* cited by examiner

SIGNALING FOR MULTIPLEXING OF LOW LATENCY COMMUNICATION AND SIDELINK COMMUNICATIONS

CROSS REFERENCES

The present Application for Patent is a continuation of U.S. patent application Ser. No. 15/711,751 by Li, et al. entitled, "Signaling For Multiplexing of Low Latency Communication and Sidelink Communications" filed Sep. 21, 2017, which claims priority to U.S. Provisional Patent Application No. 62/466,839 by Li, et al., entitled "Signaling For Multiplexing of Low Latency Communication and Sidelink Communications In Frequency Division Duplexing Systems," filed Mar. 3, 2017, and to U.S. Provisional Patent Application No. 62/469,416 by Gupta, et al., entitled "Techniques and Apparatuses For Reducing Sidelink Interference With Low-Latency Traffic In New Radio" filed Mar. 9, 2017, assigned to the assignee hereof.

BACKGROUND

The following relates generally to wireless communication, and more specifically to signaling for multiplexing of low latency communication (LLC) and sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a LLC UE and a base station may communicate in a geographic area where another UE (e.g., a sidelink UE) associated with the base station is performing sidelink or other communications. Different transmissions involving the devices, such as the sidelink UE, may cause interference that prevents or diminishes the efficacy of low-latency based communications between the base station and the LLC UE.

SUMMARY

The described techniques relate to improved methods, systems, devices, or apparatuses that support signaling for multiplexing of LLC and sidelink communications. Different transmissions involving a LLC UE, a base station, and a sidelink UE in a geographic area may cause interference that prevents or diminishes the efficacy of low-latency based communications between the base station and the LLC UE.

For example, in a frequency division duplex (FDD) system, the LLC UE (e.g., a UE capable of low-latency based communications, such as ultra-reliable low latency communications (URLLC)) may send a LLC transmission in a grant-less fashion, puncturing uplink resources allotted for sidelink data. In some examples, in a time division duplex (TDD) system, LLC transmissions may utilize transmission time intervals (TTIs) allotted for sidelink transmissions. In both cases, the sidelink UE may also be transmitting sidelink data during the same or an overlapping time via the same resources allocated for sidelink data—resulting in interference of the signals. In some cases, the LLC data may not be successfully received or decoded, and the LLC UE may need to retransmit the LLC data, and may do so using resources that would otherwise be allocated for sidelink data. As another example, a base station may transmit LLC data to a LLC UE, and the LLC UE may attempt to quickly transmit acknowledgement (ACK)/negative acknowledgement (NACK) feedback by puncturing resources allocated for sidelink data. But the ACK/NACK feedback may not be received by the base station due to interference or other problems. In either case, it may be beneficial for a sidelink UE and a LLC UE to identify scenarios in which LLC information or data is present, and initiate certain actions to minimize interference and resource waste.

Generally, in a set of examples in a FDD system, the described techniques provide for identifying an indicator associated with LLC (e.g., URLLC) while communicating in a sidelink channel, identifying dedicated uplink resources in the sidelink channel based on identifying the indicator, and reserving the dedicated uplink resources in the sidelink channel for an ACK/NACK feedback transmission. In some examples, LLC may include a first duration TTI, and the sidelink channel may include a second duration TTI that is longer than the first duration TTI. In some cases, the reserved dedicated uplink resources may include resources in multiple, successive first duration TTIs. In some cases, the reserved dedicated uplink resources may include resources in a single first duration TTI. The described techniques also provide for receiving LLC data having the first duration TTI, identifying dedicated uplink resources in a sidelink channel, and transmitting the ACK/NACK feedback using the dedicated uplink resources.

The described techniques may include performing a LLC transmission having a first duration TTI in a sidelink channel, identifying dedicated uplink resources for scheduling requests (SRs) in the sidelink channel, and transmitting a SR to a base station using the dedicated uplink resources in the sidelink channel. In some cases, the sidelink channel may include a second duration TTI, and the first duration TTI may be shorter than the second duration TTI. In some case, the LLC transmission may be transmitted before receiving a scheduling grant. If a scheduling grant is then received, the LLC may be retransmitted. Further, the described techniques provide for identifying an indicator associated with LLC, identifying dedicated uplink resources for SRs in the sidelink channel, and reserving the dedicated uplink resources for a transmission of SRs in the sidelink channel. If a scheduling grant is detected, communications on the sidelink channel may be temporarily suspended to facilitate the LLC with the base station.

In a further set of examples, in a TDD system, the described techniques may include receiving a downlink wireless communication, identifying dedicated resources for transmissions having a first duration TTI (e.g., LLC transmissions) in a sidelink channel based at least in part on receiving the downlink wireless communication. In some cases, the sidelink channel may be for performing device-to-device (D2D) wireless communications using a second duration TTI, and the first duration TTI may be shorter than the second duration TTI. The system may also include reserving the dedicated resources for LLC transmissions. Additionally, in some examples, a base station may transmit and a UE may receive an indicator associated with wireless communications having the first duration TTI in a sidelink channel while performing D2D wireless communications. In some cases, the first duration TTI may be shorter than the second duration TTI. The UE may identify dedicated resources in the sidelink channel for LLC traffic based at least in part on identifying the indicator, and may suspend sidelink communications in the sidelink channel during the identified resources.

A method of wireless communication is described. The method may include identifying an indicator associated with wireless communications having a first duration TTI in a sidelink channel while performing D2D wireless communications in the sidelink channel using a second duration TTI, wherein the first duration TTI is shorter than the second duration TTI, receiving a downlink wireless communication having the first duration TTI, wherein the downlink wireless communication is received according to a FDD configuration, identifying dedicated uplink resources for ACK/NACK feedback based at least in part on identifying the indicator, receiving the downlink wireless communication, or both, and reserving the dedicated uplink resources for a transmission of ACK/NACK feedback to a base station.

An apparatus for wireless communication is described. The apparatus may include means for identifying an indicator associated with wireless communications having a first duration TTI in a sidelink channel while performing D2D wireless communications in the sidelink channel using a second duration TTI, wherein the first duration TTI is shorter than the second duration TTI, means for receiving a downlink wireless communication having the first duration TTI, wherein the downlink wireless communication is received according to a FDD configuration, means for identifying dedicated uplink resources for ACK/NACK feedback based at least in part on identifying the indicator, receiving the downlink wireless communication, or both, and means for reserving the dedicated uplink resources for a transmission of ACK/NACK feedback to a base station.

Another apparatus for wireless communication is described. The apparatus may include a processor, memory in electronic communication with the processor, and instructions stored in the memory. The instructions may be operable to cause the processor to identify an indicator associated with wireless communications having a first duration TTI in a sidelink channel while performing D2D wireless communications in the sidelink channel using a second duration TTI, wherein the first duration TTI is shorter than the second duration TTI, receive a downlink wireless communication having the first duration TTI, wherein the downlink wireless communication is received according to a FDD configuration, identify dedicated uplink resources for ACK/NACK feedback based at least in part on identifying the indicator, receiving the downlink wireless communication, or both, and reserve the dedicated uplink resources for a transmission of ACK/NACK feedback to a base station.

A non-transitory computer readable medium for wireless communication is described. The non-transitory computer-readable medium may include instructions operable to cause a processor to identify an indicator associated with wireless communications having a first duration TTI in a sidelink channel while performing D2D wireless communications in the sidelink channel using a second duration TTI, wherein the first duration TTI is shorter than the second duration TTI, receive a downlink wireless communication having the first duration TTI, wherein the downlink wireless communication is received according to a FDD configuration, identify dedicated uplink resources for ACK/NACK feedback based at least in part on identifying the indicator, receiving the downlink wireless communication, or both, and reserve the dedicated uplink resources for a transmission of ACK/NACK feedback to a base station.

In some examples of the method, apparatus, and non-transitory computer-readable medium described above, the dedicated uplink resources comprise a resource in each first duration TTI in a plurality of successive first TTIs.

In some examples of the method, apparatus, and non-transitory computer-readable medium described above, the dedicated uplink resources comprise a resource in a subset of the first duration TTIs in a plurality of successive first TTIs.

Some examples of the method, apparatus, and non-transitory computer-readable medium described above may further include processes, features, means, or instructions for monitoring an indication channel in the plurality of successive first TTIs to identify a presence of low latency traffic. Some examples of the method, apparatus, and non-transitory computer-readable medium described above may further include processes, features, means, or instructions for determining the subset based at least in part on monitoring the indication channel.

Some examples of the method, apparatus, and non-transitory computer-readable medium described above may further include processes, features, means, or instructions for reserving the dedicated uplink resources comprises emptying at least one resource of scheduled sidelink data transmissions.

In some examples of the method, apparatus, and non-transitory computer-readable medium described above, the subset of the first duration TTIs may be a single first duration TTI in the plurality of successive first TTIs.

Some examples of the method, apparatus, and non-transitory computer-readable medium described above may further include processes, features, means, or instructions for monitoring, during a first period, a downlink indication channel in each first duration TTI in a plurality of successive first TTIs for low latency communication information. Some examples of the method, apparatus, and non-transitory computer-readable medium described above may further include processes, features, means, or instructions for determining whether a traffic profile of low latency communication during the first period may be above a threshold based at least in part on the monitoring, wherein reserving the dedicated uplink resources for transmitting ACK/NACK feedback comprises reserving the dedicated uplink resources using a first mode or a second mode based at least in part on the determination.

In some examples of the method, apparatus, and non-transitory computer-readable medium described above, a traffic profile of low latency communication comprises at least one of the group including a traffic rate, a traffic level of reliability requirement, and an amount of URLLC traffic during a period of time.

In some examples of the method, apparatus, and non-transitory computer-readable medium described above, the first mode comprises reserving a resource in each first duration TTI in the plurality of successive first TTIs. In some examples of the method, apparatus, and non-transitory computer-readable medium described above, the second mode comprises reserving a resource in a next first duration TTI in the plurality of successive first TTIs.

In some examples of the method, apparatus, and non-transitory computer-readable medium described above, the indicator comprises a presence of low latency communication traffic, a location of a low latency communication UE, other information associated with low latency communication, or a combination thereof.

In some examples of the method, apparatus, and non-transitory computer-readable medium described above, the downlink wireless communication having the first duration TTI comprises low latency communication data.

A method of wireless communication is described. The method may include performing wireless uplink communications having a first duration TTI in a sidelink channel, the sidelink channel also configured for wireless communications having a second duration TTI, wherein the first duration TTI is shorter than the second duration TTI, identifying an indicator associated with the wireless uplink communications, identifying dedicated uplink resources for scheduling requests (SRs) for wireless uplink communications having the first duration TTI in the sidelink channel, reserving the dedicated uplink resources for a transmission of SRs for wireless uplink communications having the first duration TTI, and transmitting a SR to a base station using the dedicated uplink resources in the sidelink channel.

An apparatus for wireless communication is described. The apparatus may include means for performing wireless uplink communications having a first duration TTI in a sidelink channel, the sidelink channel also configured for wireless communications having a second duration TTI, wherein the first duration TTI is shorter than the second duration TTI, means for identifying an indicator associated with the wireless uplink communications, means for identifying dedicated uplink resources for SRs for wireless uplink communications having the first duration TTI in the sidelink channel, means for reserving the dedicated uplink resources for a transmission of SRs for wireless uplink communications having the first duration TTI, and means for transmitting a SR to a base station using the dedicated uplink resources in the sidelink channel.

Another apparatus for wireless communication is described. The apparatus may include a processor, memory in electronic communication with the processor, and instructions stored in the memory. The instructions may be operable to cause the processor to perform wireless uplink communications having a first duration TTI in a sidelink channel, the sidelink channel also configured for wireless communications having a second duration TTI, wherein the first duration TTI is shorter than the second duration TTI, identify an indicator associated with the wireless uplink communications, identify dedicated uplink resources for SRs for wireless uplink communications having the first duration TTI in the sidelink channel, reserve the dedicated uplink resources for a transmission of SRs for wireless uplink communications having the first duration TTI, and transmit a SR to a base station using the dedicated uplink resources in the sidelink channel.

A non-transitory computer readable medium for wireless communication is described. The non-transitory computer-readable medium may include instructions operable to cause a processor to perform wireless uplink communications having a first duration TTI in a sidelink channel, the sidelink channel also configured for wireless communications having a second duration TTI, wherein the first duration TTI is shorter than the second duration TTI, identify an indicator associated with the wireless uplink communications, identify dedicated uplink resources for SRs for wireless uplink communications having the first duration TTI in the sidelink channel, reserve the dedicated uplink resources for a transmission of SRs for wireless uplink communications having the first duration TTI, and transmit a SR to a base station using the dedicated uplink resources in the sidelink channel.

In some examples of the method, apparatus, and non-transitory computer-readable medium described above, the dedicated uplink resources comprise a resource in each first duration TTI in a plurality of successive first TTIs.

In some examples of the method, apparatus, and non-transitory computer-readable medium described above, the dedicated uplink resources comprise a resource in a subset of the first duration TTIs in a plurality of successive first TTIs.

In some examples of the method, apparatus, and non-transitory computer-readable medium described above, performing the wireless uplink communications in the sidelink channel comprises: transmitting a low latency communication having the first duration TTI to the base station before receiving a scheduling grant.

Some examples of the method, apparatus, and non-transitory computer-readable medium described above may further include processes, features, means, or instructions for receiving a transmission failure indicator in response to transmitting the low latency communication. Some examples of the method, apparatus, and non-transitory computer-readable medium described above may further include processes, features, means, or instructions for receiving a scheduling grant in response to transmitting the SR to the base station.

Some examples of the method, apparatus, and non-transitory computer-readable medium described above may further include processes, features, means, or instructions for retransmitting the low latency communication having the first duration TTI to the base station in the sidelink channel based at least in part on the scheduling grant.

In some examples of the method, apparatus, and non-transitory computer-readable medium described above, the transmission failure indicator and the scheduling grant may be received during the same transmission.

Some examples of the method, apparatus, and non-transitory computer-readable medium described above may further include processes, features, means, or instructions for monitoring a downlink indication channel in each first duration TTI in a plurality of successive first TTIs. Some examples of the method, apparatus, and non-transitory computer-readable medium described above may further include processes, features, means, or instructions for detecting a scheduling grant based at least in part on the monitoring.

Some examples of the method, apparatus, and non-transitory computer-readable medium described above may further include processes, features, means, or instructions for suspending sidelink communications in the sidelink channel during a single first duration TTI in the plurality of successive first TTIs based at least in part on detecting the scheduling grant.

In some examples of the method, apparatus, and non-transitory computer-readable medium described above, the single first duration TTI comprises a next first duration TTI in the plurality of successive first TTIs.

A method of wireless communication is described. The method may include receiving a downlink wireless communication according to a TDD configuration, identifying dedicated resources for transmission having a first duration TTI in a sidelink channel based at least in part on receiving the downlink wireless communication, wherein the sidelink channel is for performing D2D wireless communications using a second duration TTI, and wherein the first duration TTI is shorter than the second duration TTI, and reserving the dedicated resources for transmissions having the first TTI.

An apparatus for wireless communication is described. The apparatus may include means for receiving a downlink wireless communication according to a TDD configuration, means for identifying dedicated resources for transmission having a first duration TTI in a sidelink channel based at least in part on receiving the downlink wireless communication, wherein the sidelink channel is for performing D2D wireless communications using a second duration TTI, and wherein the first duration TTI is shorter than the second duration TTI, and means for reserving the dedicated resources for transmissions having the first TTI.

Another apparatus for wireless communication is described. The apparatus may include a processor, memory in electronic communication with the processor, and instructions stored in the memory. The instructions may be operable to cause the processor to receive a downlink wireless communication according to a TDD configuration, identify dedicated resources for transmission having a first duration TTI in a sidelink channel based at least in part on receiving the downlink wireless communication, wherein the sidelink channel is for performing D2D wireless communications using a second duration TTI, and wherein the first duration TTI is shorter than the second duration TTI, and reserve the dedicated resources for transmissions having the first TTI.

A non-transitory computer readable medium for wireless communication is described. The non-transitory computer-readable medium may include instructions operable to cause a processor to receive a downlink wireless communication according to a TDD configuration, identify dedicated resources for transmission having a first duration TTI in a sidelink channel based at least in part on receiving the downlink wireless communication, wherein the sidelink channel is for performing D2D wireless communications using a second duration TTI, and wherein the first duration TTI is shorter than the second duration TTI, and reserve the dedicated resources for transmissions having the first TTI.

Some examples of the method, apparatus, and non-transitory computer-readable medium described above may further include processes, features, means, or instructions for identifying scheduled gaps in the sidelink channel, wherein identifying the dedicated resources may be based at least in part on the identified scheduled gaps.

In some examples of the method, apparatus, and non-transitory computer-readable medium described above, the downlink wireless communication may be received in a downlink control channel of a frame, a subframe, or a slot corresponding to the dedicated resources.

In some examples of the method, apparatus, and non-transitory computer-readable medium described above, identifying dedicated resources comprises: identifying a TDD pattern. Some examples of the method, apparatus, and non-transitory computer-readable medium described above may further include processes, features, means, or instructions for determining whether low latency traffic may be uplink traffic or downlink traffic, based at least in part on the identified TDD pattern.

Some examples of the method, apparatus, and non-transitory computer-readable medium described above may further include processes, features, means, or instructions for determining that low latency communications will utilize two or less first duration TTIs.

A method of wireless communication is described. The method may include identifying an indicator associated with wireless communications having a first duration TTI in a sidelink channel while performing D2D wireless communications in a sidelink channel using a second duration TTI transmissions, wherein the first duration TTI is shorter than the second duration TTI, identifying dedicated resources in the sidelink channel for low latency communications based at least in part on identifying the indicator, and suspending sidelink communications in the sidelink channel during the identified resources.

An apparatus for wireless communication is described. The apparatus may include means for identifying an indicator associated with wireless communications having a first duration TTI in a sidelink channel while performing D2D wireless communications in a sidelink channel using a second duration TTI transmissions, wherein the first duration TTI is shorter than the second duration TTI, means for identifying dedicated resources in the sidelink channel for low latency communications based at least in part on identifying the indicator, and means for suspending sidelink communications in the sidelink channel during the identified resources.

Another apparatus for wireless communication is described. The apparatus may include a processor, memory in electronic communication with the processor, and instructions stored in the memory. The instructions may be operable to cause the processor to identify an indicator associated with wireless communications having a first duration TTI in a sidelink channel while performing D2D wireless communications in a sidelink channel using a second duration TTI transmissions, wherein the first duration TTI is shorter than the second duration TTI, identify dedicated resources in the sidelink channel for low latency communications based at least in part on identifying the indicator, and suspend sidelink communications in the sidelink channel during the identified resources.

A non-transitory computer readable medium for wireless communication is described. The non-transitory computer-readable medium may include instructions operable to cause a processor to identify an indicator associated with wireless communications having a first duration TTI in a sidelink channel while performing D2D wireless communications in a sidelink channel using a second duration TTI transmissions, wherein the first duration TTI is shorter than the second duration TTI, identify dedicated resources in the sidelink channel for low latency communications based at least in part on identifying the indicator, and suspend sidelink communications in the sidelink channel during the identified resources.

Some examples of the method, apparatus, and non-transitory computer-readable medium described above may further include processes, features, means, or instructions for determining that low latency communications will utilize more than two first duration TTIs, wherein identifying the indicator may be based at least in part on the determining.

In some examples of the method, apparatus, and non-transitory computer-readable medium described above, identifying dedicated resources comprises: identifying a TDD pattern. Some examples of the method, apparatus, and non-transitory computer-readable medium described above may further include processes, features, means, or instructions for determining whether low latency traffic may be uplink traffic or downlink traffic, based at least in part on the identified TDD pattern.

Some examples of the method, apparatus, and non-transitory computer-readable medium described above may further include processes, features, means, or instructions for performing one or more low latency transmissions on the identified resources in the sidelink channel. Some examples of the method, apparatus, and non-transitory computer-readable medium described above may further include processes, features, means, or instructions for resuming sidelink communications on the sidelink channel after performing the one or more low latency transmissions.

DETAILED DESCRIPTION

Figure 1:
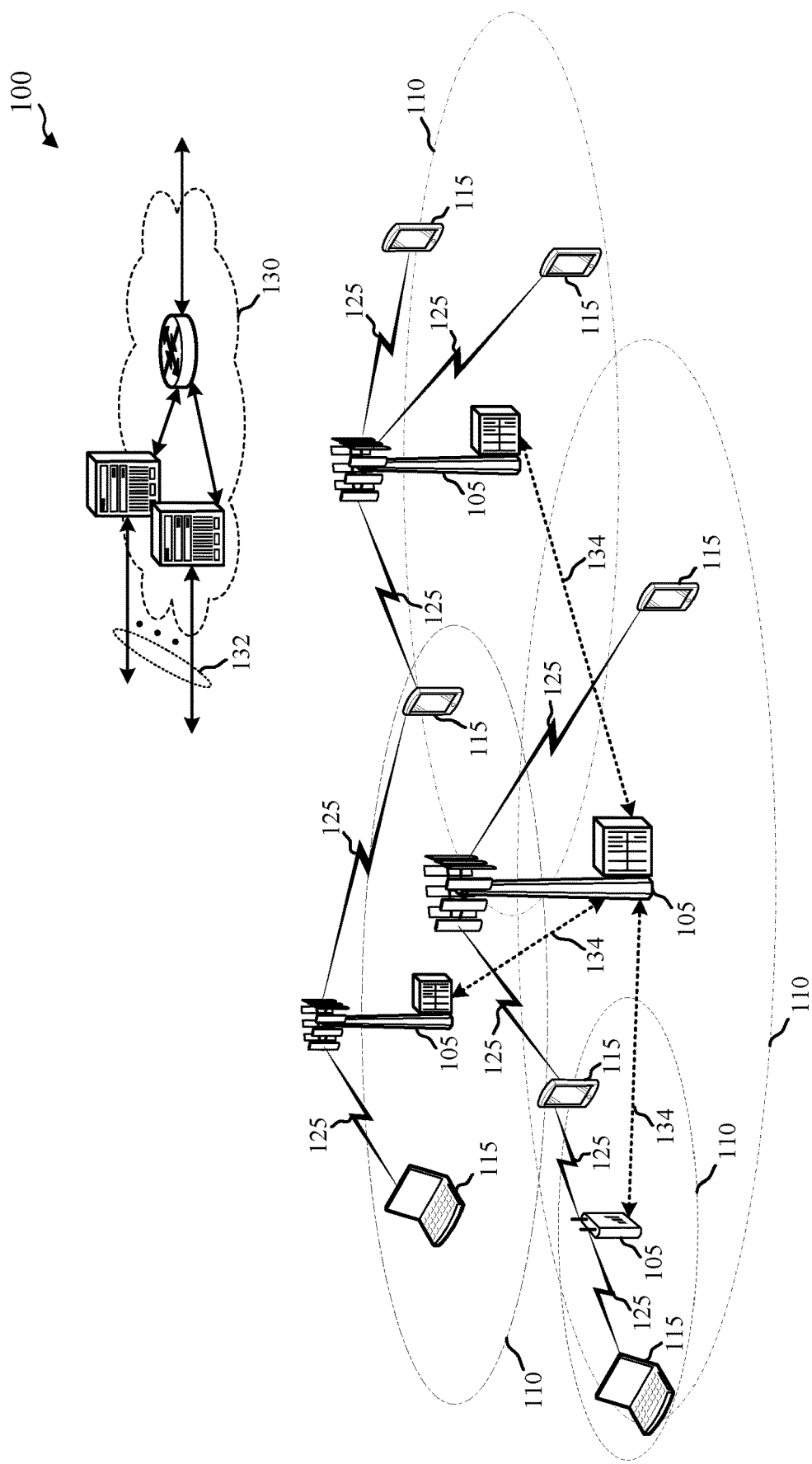
FIG. 1 illustrates an example of a system for wireless communication that supports signaling for multiplexing of LLC and sidelink communications in accordance with aspects of the present disclosure.

Different transmissions utilizing time division duplexing (TDD) or frequency division duplexing (FDD) and involving a low latency communication (LLC) user equipment (UE), a base station, and a sidelink UE in a geographic area may cause interference that prevents or diminishes the efficacy of low-latency based communications between the base station and the LLC UE. For example, in a FDD system, the LLC UE (e.g., a UE capable of LLC communications, such as ultra-reliable low latency communication (URLLC) may send a LLC transmission in a grant-less fashion, puncturing uplink resources allotted for sidelink data. The sidelink UE may also be transmitting sidelink data during the same or an overlapping time via the same resources allocated for sidelink data—resulting in interference of the transmitted signals. The LLC data may not be successfully received or decoded, and the LLC UE may need to retransmit the LLC data using resources otherwise allocated for sidelink data. As another example, a base station may transmit LLC data to a LLC UE, and the LLC UE may attempt to quickly transmit acknowledgement/negative acknowledgement (ACK/NACK) feedback by puncturing resources allocated for sidelink data, but the ACK/NACK feedback may not be received by the base station due to interference. In either case, it may be beneficial for a sidelink UE and the LLC UE to identify scenarios in which LLC data is present and respond accordingly to minimize interference and wasted resources. A base station may reserve an indication channel in downlink transmissions to convey the presence of LLC data (e.g., URLLC data). The base station may assign the indication channel to a first duration transmission time interval (TTI) (e.g., a mini-slot) in downlink transmissions and transmit the indication channel in other first duration TTIs (e.g., each successive first duration TTI). The indication channel may include information on the presence of LLC traffic, the location of a LLC transmission, and other information associated with LLC.

In some cases, a base station may send a LLC transmission to a LLC UE. LLC transmissions, such as URLLC transmissions, may require fast hybrid acknowledgement repeat request (HARD) turnaround. A LLC UE may need to transmit an ACK/NACK feedback immediately following a LLC transmission from a base station. In order to ensure that every ACK/NACK transmission is successfully received by the base station, a sidelink UE may reserve uplink resources for LLC ACK/NACK feedback signaling. The sidelink UE may monitor the indication channel to determine whether a LLC transmission (that may include LLC data) is present for the LLC UE in the region. Upon determining that LLC data is present in a first duration TTI, the sidelink UE may reserve, in one or more first duration TTIs, one or more resources for ACK/NACK feedback signaling. Upon receiving the LLC transmission, a LLC UE may immediately identify the reserved resources for ACK/NACK signaling, and transmit ACK/NACK feedback to the base station via the reserved resources. The sidelink UE may utilize a dynamic mode for reserving resources. The sidelink UE may monitor the indication channel in each first duration TTI, and may reserve one or more resources for ACK/NACK feedback in one or more first duration TTIs (e.g., the next first duration TTI) following the first duration TTI in which the indicator was detected. Alternatively, the sidelink UE may engage in a static mode of reserving resources, and may reserve one or more resources in each of the first duration TTIs in a plurality of successive first TTIs related to a second duration TTI. In some examples, the sidelink UE may identify a traffic profile, and may select the dynamic mode or the static mode based on the traffic profile.

In some cases, a LLC UE may transmit LLC data to the base station, puncturing uplink resources allotted for sidelink data. It may be beneficial for the LLC UE to also transmit a SR to the base station to reserve subsequent resources for a retransmission if the first transmission of the LLC data fails. The sidelink UE may reserve dedicated resources in every first duration TTI of the sidelink channels upon detection of the first LLC transmission. The LLC UE may transmit a SR on the reserved dedicated resources while simultaneously transmitting the LLC data. A base station may detect and decode the SR on the dedicated resource. If the first transmission fails (e.g., due to interference), the base station may transmit a scheduling grant to schedule a second transmission on a reserved downlink indication channel in response to the SR. The sidelink UE may monitor the downlink indication channel in at least some, if not every, first duration TTI. If the retransmission scheduling grant is detected, the sidelink UE may suspend ongoing sidelink transmissions in the resources allocated for the second transmission to accommodate LLC traffic.

In other examples, in a TDD system, a base station may transmit control information indicating dedicated resources for LLC transmissions. A sidelink UE may identify dedicated resources, which may be based on gaps in scheduled sidelink transmissions. The sidelink UE may reserve dedicated uplink resources corresponding to identified TTIs (e.g., symbols) and an LLC UE may utilize these reserved resources to transmit (or receive) LLC transmissions. In still other examples of a TDD system, a base station may transmit LLC transmissions, and may also broadcast an indicator, which includes an override signal for the case in which LLC transmissions are pending. A sidelink UE may identify the indicator, and may identify dedicated resources corresponding to the indicator for LLC traffic. During the identified resources, the sidelink UE may suspend sidelink communications, and may resume sidelink communications after an LLC UE has transmitted or received LLC traffic. If the sidelink UE does not detect the override signal while monitoring the indicator, then the sidelink UE may resume sidelink transmissions immediately.

In some cases, LLC traffic may correspond to short duration transmissions (e.g., two symbols or less). In such examples, a base station may avoid interference in a sidelink channel by reserving signals in certain TTIs (e.g. symbols) for LLC traffic. The base station may identify reserved TTIs in a downlink control channel (e.g., a PDCCH), and may utilize gaps in scheduled sidelink signaling for the reserved TTIs.

In some cases, LLC traffic may correspond to relatively longer durations (e.g., more than two symbols). In such cases, a base station may avoid interference in a sidelink channel by transmitting the indicator, such that the sidelink UE may suspend transmission during resources corresponding to the indicator.

Aspects of the disclosure are initially described in the context of a wireless communications system. Aspects of the disclosure are further illustrated by and described with reference to wireless communications systems and wireless communications configurations. Aspects of the disclosure are further illustrated by and described with reference to apparatus diagrams, system diagrams, and flowcharts that relate to signaling for multiplexing of LLC and sidelink communications. Although various aspects of the present techniques relate to improved methods, systems, devices, or apparatuses that support signaling for multiplexing in sidelink and URLLC FDD systems, the present disclosure is not limited to these systems or applications. Additionally, the present disclosure is not limited to sidelink communications and URLLC, and any discussion of sidelink, URLLC, or LLC is merely exemplary of the broader applications of these techniques to other information or transmissions, including, but not limited to, mission critical or other time-sensitive communication and applications.

FIG. 1 illustrates an example of a wireless communications system 100 that supports signaling for multiplexing in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

In some cases, base stations and UEs may utilize dynamic resource sharing to transmit critical information in an FDD system. The critical information may include URLLC or mission critical (MiCr) information. Alternatively, enhanced mobile broadband (eMBB) communications may be utilized for general communications not deemed critical. The dynamic resource sharing may include puncturing, wherein a base station may not wait for successive TTIs to transmit URLLC data. In downlink messaging, a base station may utilize an indication-based multiplexing approach to convey puncturing to the UE. An eMBB UE may detect an indicator transmitted by the base station and discard resources reserved for URLLC, which may improve decoding performance and improve UE power efficiency. Additionally or alternatively, a URLLC UE may detect the indicator transmitted by the base station and then start decoding the multiplexed information. The indicator may contain information such as a flag indicating the existence of URLLC data, frequency or time punctured resources, a power ratio, etc. While the base station may transmit the indicator to the UEs, the UEs may transmit other information to each other.

In some cases, wireless communications system 100 may support signaling for multiplexing (e.g., signaling for sidelink/URLLC multiplexing) in an FDD system. A base station may transmit URLLC data to a URLLC UE. The URLLC UE may immediately transmit acknowledgement ACK/NACK feedback. A sidelink UE may monitor an indication channel to determine when URLLC data is present, and may reserve resources otherwise allocated to sidelink data for URLLC ACK/NACK feedback. The URLLC UE may transmit ACK/NACK feedback via the reserved resources. A URLLC UE may transmit URLLC data via resources allocated for sidelink data. The sidelink UE may reserve resources for a SR. The URLLC UE may utilize the reserved resources to transmit a SR while transmitting the URLLC data. The sidelink UE may monitor the indication channel and determine when a base station has transmitted a retransmission scheduling grant to the URLLC data in response to a SR. The sidelink UE may suspend transmission on resources granted to a scheduled transmission of URLLC data.

In some cases, base stations and UEs may utilize dynamic resource sharing to transmit critical information in a TDD system. The critical information may include URLLC or mission critical (MiCr) information. Alternatively, enhanced mobile broadband (eMBB) communications may be utilized for general communications not deemed critical. Dynamic resource sharing in the time domain may allow for the transmission of URLLC data without interference from sidelink transmissions. In some examples, a base station may transmit control information indicating dedicated resources for LLC transmissions. A sidelink UE may identify dedicated resources, which may be based on gaps in scheduled sidelink transmissions. The sidelink UE may reserve dedicated uplink resources corresponding to identified TTIs (e.g., symbols) and an LLC UE may utilize these reserved resources to transmit (or receive) LLC transmissions. In still other examples of a TDD system, a base station may transmit LLC transmissions, and may also broadcast an indicator, which includes an override signal for the case in which LLC transmissions are pending. A sidelink UE may identify the indicator, and may identify dedicated resources corresponding to the indicator for LLC traffic. During the identified resources, the sidelink UE may suspend sidelink communications, and may resume sidelink communications after an LLC UE has transmitted or received LLC traffic. If the sidelink UE does not detect the override signal while monitoring the indicator, then the sidelink UE may resume sidelink transmissions immediately.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or D2D protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105 or next generation NodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency dimension multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Figure 2:
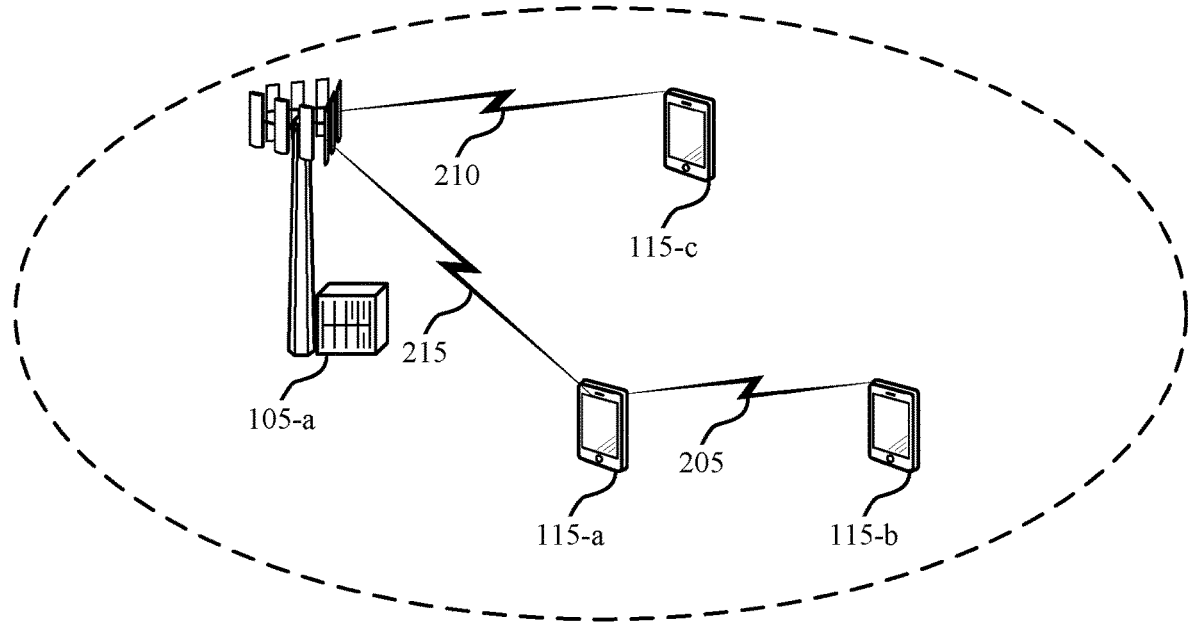
FIG. 2 illustrates an example of a wireless communication system that supports signaling for multiplexing of LLC and sidelink communications in accordance with aspects of the present disclosure.

FIG. 2 illustrates an example of a wireless communications system 200 that supports signaling for multiplexing of LLC and sidelink communications in accordance with various aspects of the present disclosure. Wireless communications system 200 may include a base station 105-*a*, a sidelink UE 115-*a*, a sidelink UE 115-*b*, and a URLLC UE 115-*c*, which may be examples of the UE 115 and base station 105 described with reference to FIG. 1. Base station 105-*a* and UEs 115 may operate using mmW spectrum.

Sidelink UE 115-*a* and sidelink UE 115-*b* may communicate via sidelink communications. For example, sidelink UE 115-*a* may transmit sidelink transmission 205 to sidelink UE 115-*b*. In some examples, UE 115-*a* may broadcast sidelink transmission 205. In such cases, sidelink UE 115-*a* may transmit a signal (e.g., a broadcast signal) to multiple sidelink UEs 115, including sidelink UE 115-*b*. The sidelink signal may be transmitted in multiple directions, such that the signal may impact communications related to base station 105-*a* as interference 215. Base station 105-*a* and URLLC UE 115-*c* may communicate via URLLC transmissions. URLLC UE 115-*c* may send URLLC transmission 210 to base station 105-*a* on the uplink. While receiving URLLC transmission 210, communications related to base station 105-*a* may be subject to interference 215, due to sidelink transmission 205.

Base station 105-*a* may be geographically associated with URLLC UE 115-*c*. In such cases, base station 105-*a* may reserve an indication channel in downlink transmissions to convey the presence of URLLC data or URLLC transmissions. The indication channel may include information on the presence of URLLC traffic, the location of URLLC transmission, and other information associated with URLLC. If the indicator is not detected by URLLC UE 115-*c*, URLLC UE 115-*c* may not monitor or decode sidelink channel information. Alternatively, if the indicator is detected, URLLC UE 115-*c* may receive and decode the URLLC data. Similarly, if sidelink UE 115-*a* detects the indication, sidelink UE 115-*a* may discard resources associated with URLLC data that punctures sidelink transmissions in the decoding process instead of expending power on decoding corrupted resources, improving decoding performance and power efficiency at UE 115-*a*.

In some examples, URLLC UE 115-*c* may send URLLC transmission 210 to base station 105-*a* on an uplink, or receive a URLLC transmission 210 on a downlink. Sidelink UE 115-*a* may also send sidelink transmission 205 to sidelink UE 115-*b*. Because sidelink transmission 205 and the URLLC transmission 210 have different TTIs, URLLC UE 115-*c* may utilize puncturing to transmit the URLLC data via uplink resources reserved for sidelink transmission 205. However, because URLLC transmission 210 may utilize resources allocated for sidelink transmission 205, sidelink transmission 205 may cause interference 215 at base station 105-*a*. Thus, when operating in an FDD system, it may be beneficial for sidelink UE 115-*a* to detect a current or subsequent URLLC transmission 210, determine that puncturing is occurring or may occur, and respond accordingly. Base station 105-*a* may not successfully receive or successfully decode URLLC transmission 210, and may require URLLC UE 115-*c* to retransmit URLLC transmission 210. Therefore, URLLC UE 115-*c* may benefit from allocated resources to transmit a SR signal simultaneously with URLLC transmission 210. Additionally, when operating in a TDD system, it may be beneficial for base station 105-*a* to identify and reserve TTIs for downlink or uplink URLLC transmissions 210, thus avoiding interference 215. In some cases, base station 105-*a* may transmit an indicator channel, allowing a TDD sidelink UE 115-*a* to monitor the channel and determine that URLLC transmissions are occurring or may occur during a particular TTI, and respond accordingly.

In some examples, sidelink UE 115-*a* may reserve uplink resources allocated for sidelink transmission 205 for scheduling requests (SRs) during uplink puncturing. When URLLC traffic is present, URLLC UE 115-*c* may puncture the sidelink transmission 205 to immediately transmit the URLLC data in a first URLLC transmission 210 in a grant-less fashion. Sidelink UE 115-*a* may reserve dedicated resources in every first duration TTI of the sidelink transmission 205 when a first URLLC transmission 210 is detected. URLLC UE 115-*c* may transmit a SR on the reserved dedicated resources while simultaneously transmitting the URLLC data. Base station 105-a may detect and decode the SR on the dedicated resource. If the first transmission fails (e.g., due to interference between the puncturing URLLC transmission 210 and the punctured sidelink transmission 205), base station 105-a may transmit a scheduling grant to schedule a second URLLC transmission 210. Base station 105-a may send the scheduling grant on a reserved downlink indication channel in response to the SR. Sidelink UE 115-a may monitor the downlink indication channel in every first duration TTI. If the retransmission scheduling grant is detected, sidelink UE 115-a may suspend ongoing sidelink transmission 205 in the resources allocated for the second URLLC transmission 210 to accommodate URLLC traffic.

In some examples, base station 105-a may have URLLC data to transmit to URLLC UE 115-c. URLLC transmissions may require fast hybrid acknowledgement repeat request (HARD) turnaround. Upon receiving URLLC data from base station 105-a, URLLC UE 115-c may need to transmit an ACK/NACK feedback immediately following a URLLC transmission from base station 105-a. In such cases, it may be beneficial for sidelink UE 115-a to reserve resources allotted for sidelink transmission 205 for URLLC ACK/NACK feedback. URLLC UE 115-c may utilize these reserved resources for transmitting ACK/NACK feedback, such that the feedback message has a high likelihood of being successfully received by base station 105-a. Sidelink UE 115-a may reserve resources for transmitting ACK/NACK feedback in a static mode, in a dynamic mode, or a hybrid mode where sidelink UE monitors a traffic profile and determines which mode to apply during a given time period.

In some examples of a TDD system, base station 105-a may transmit a downlink control signal, which may identify dedicated resources for URLLC transmissions. Sidelink UE 115-a may identify the dedicated resources based on the downlink control signal, and may reserve the dedicated resources for URLLC traffic. In some cases, the dedicated resources may be based on gaps identified in the sidelink channel. In some examples, base station 1025-a may transmit an indicator channel, which sidelink UE 115-a may monitor. By monitoring the indicator channel, UE 115-a may determine when URLLC traffic is occurring or will occur. If an indicator channel indicates that URLLC traffic is pending, sidelink UE 115-a may suspend transmission during the TTI corresponding to the indicator channel. Upon completion of the URLLC transmission, or upon determining that no URLLC transmission is pending, sidelink UE 115-a may resume transmissions.

Figure 3:
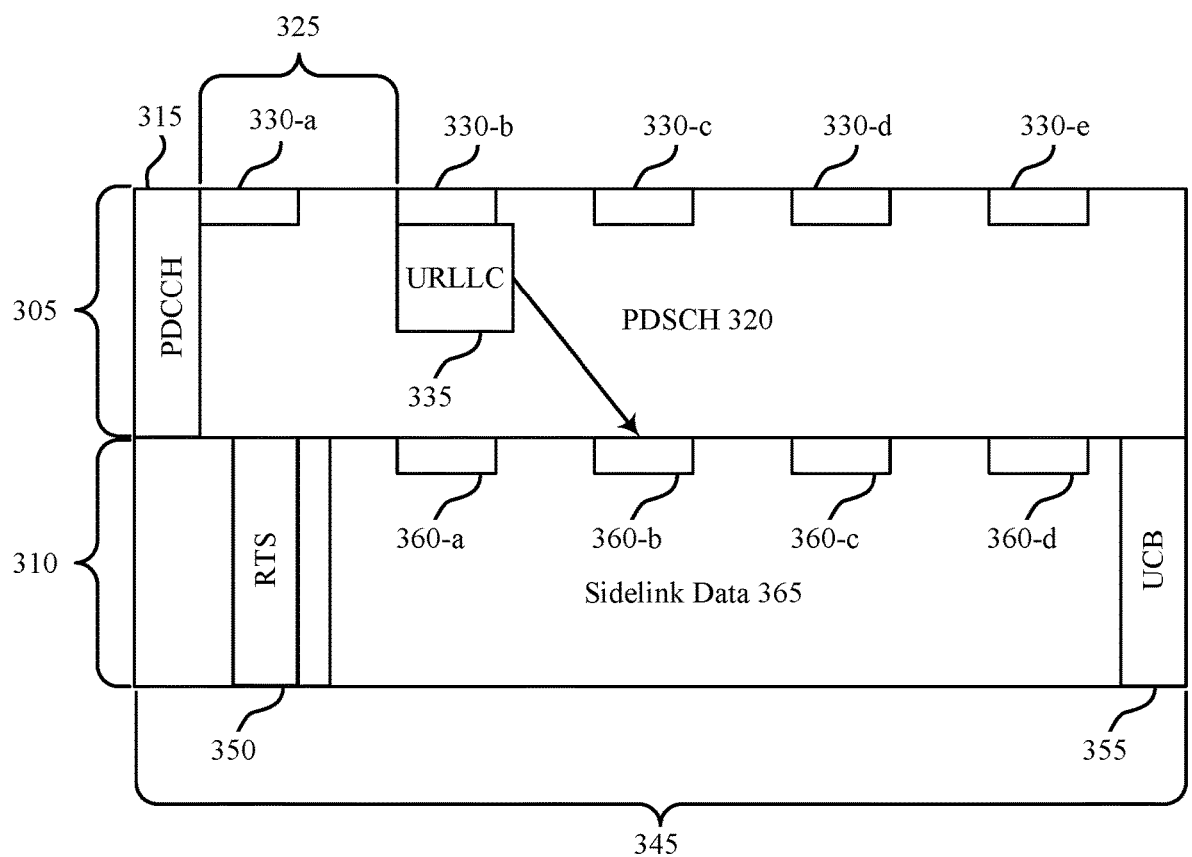
FIG. 3 illustrates an example of a wireless communication configuration that supports signaling for multiplexing of LLC and sidelink communications in accordance with aspects of the present disclosure.

FIG. 3 illustrates an example of a wireless communications configuration 300 that supports signaling for multiplexing of LLC and sidelink communications in accordance with various aspects of the present disclosure. In some cases, wireless communications configuration 300 may represent aspects of techniques performed by a UE 115 or base station 105 as described with reference to FIGS. 1-2.

In some cases, available resources in a geographic sector may be allocated between downlink 305 and uplink 310. Downlink 305 may include a PDCCH 315 and a PDSCH 320. In some examples, a gNB or a URLLC UE may have some URLLC data to transmit. Such transmissions may be transmitted in a grant-less fashion, and may require rapid HARQ turn around. URLLC transmissions may require a short transmission time duration in order to transmit, receive ACK/NACK feedback, and, if necessary, retransmit within a minimum time period. For example, URLLC transmissions may correspond to a first duration TTI 325. In some cases first duration TTI 325 may be a mini-slot. In such cases, first duration TTI 325 may include two OFDM symbols.

If a URLLC UE is located within the same geographic sector as a base station 105 (e.g., a gNB) base station 105 may assign an indication channel 330 to downlink 305. Indication channel 330 may be assigned to each first duration TTI 325 of downlink 305. For example, indication channel 330-a may be assigned to a first duration TTI 325, indication channel 330-b may be assigned to another first duration TTI 325, and so forth. Indication channel 330 may include an indicator, which may convey information on the presence of URLLC traffic. For example, base station 105 may transmit URLLC data 335. URLLC data 335 may puncture resources allotted to PDSCH 320. Indication channel 330 may carry an indicator which conveys the information that URLLC data 335 is or will be transmitted. In some examples, indication channel 330-a may convey that URLLC data 335 will be transmitted in a subsequent first duration TTI 325 corresponding to indication channel 330-b. In other examples, indication channel 330-b may convey that URLLC data 335 is currently being transmitted in the same first duration TTI 325.

A UE 115 may engage in D2D communication with another sidelink UE 115 via uplink 310. In some cases, sidelink communication may include a broadcast transmissions, from one sidelink UE 115 to multiple sidelink UEs 115. Sidelink UE 115 may receive a grant for sidelink data 365 via PDCCH 315. A subframe for transmission of sidelink data 365 on uplink 310 may be related to a second duration TTI 345. For example, second duration TTI 345 may be a slot, or may be greater than or equal to 500 microseconds. In some examples, a subframe for uplink 310 may include (RTS) 350, and uplink common burst (UCB) 355. RTS 350 may include a group destination identifier, a duration of transmission, a reference signal (RS) to enable channel estimation and receiver yielding, and a modulation and coding scheme (MCS) indicator. UCB 355 may enable all UEs to perform an uplink report.

In some examples, a URLLC UE 115 may receive URLLC data 335. Because URLLC data requires fast HARQ turn around, ACK/NACK feedback may be transmitted immediately following reception of URLLC data 335. ACK/NACK feedback may be bursty and unpredictable. Thus, sidelink UE 115 may monitor indication channel 330 for the indicator. If sidelink UE 115 identifies the indicator, sidelink UE 115 may identify dedicated URLLC ACK/NACK resources 360 on uplink 310 for ACK/NACK feedback. Sidelink UE 115 may then empty the corresponding resources and reserve the identified URLLC ACK/NACK resources for ACK/NACK feedback. URLLC UE 115 may receive URLLC data 335 and transmit URLLC ACK/NACK feedback via URLLC ACK/NACK resources 360.

For example, sidelink UE 115 may monitor indication channel 330 over a period of time. Sidelink UE 115 may not identify an indicator on indication channel 330-a. However, sidelink UE 115 may identify an indicator on indication channel 330-b corresponding to the transmission of URLLC data 335. Having identified the indicator, sidelink UE 115 may identify and reserve URLLC ACK/NACK resources 360-a, 360-b, 360-c, and 360-d corresponding to each first duration TTI 325 throughout second duration TTI 345. URLLC UE 115 may receive URLLC data 335 and transmit ACK/NACK feedback utilizing one or more URLLC ACK/NACK resources 360-b. If necessary, URLLC UE 115 may transmit additional ACK/NACK feedback via reserved URLLC ACK/NACK resources 360-*c* or 360-*d*.

The above described static method of identifying, emptying, and reserving URLLC ACK/NACK resources 360 may provide highly reliable ACK/NACK feedback in response to URLLC data. Multiple opportunities in multiple first duration TTIs 325 are provided for transmitting ACK/NACK feedback. However, in some cases, a sidelink UE may utilize a more dynamic mode of reserving resources for ACK/NACK feedback.

Figure 4:
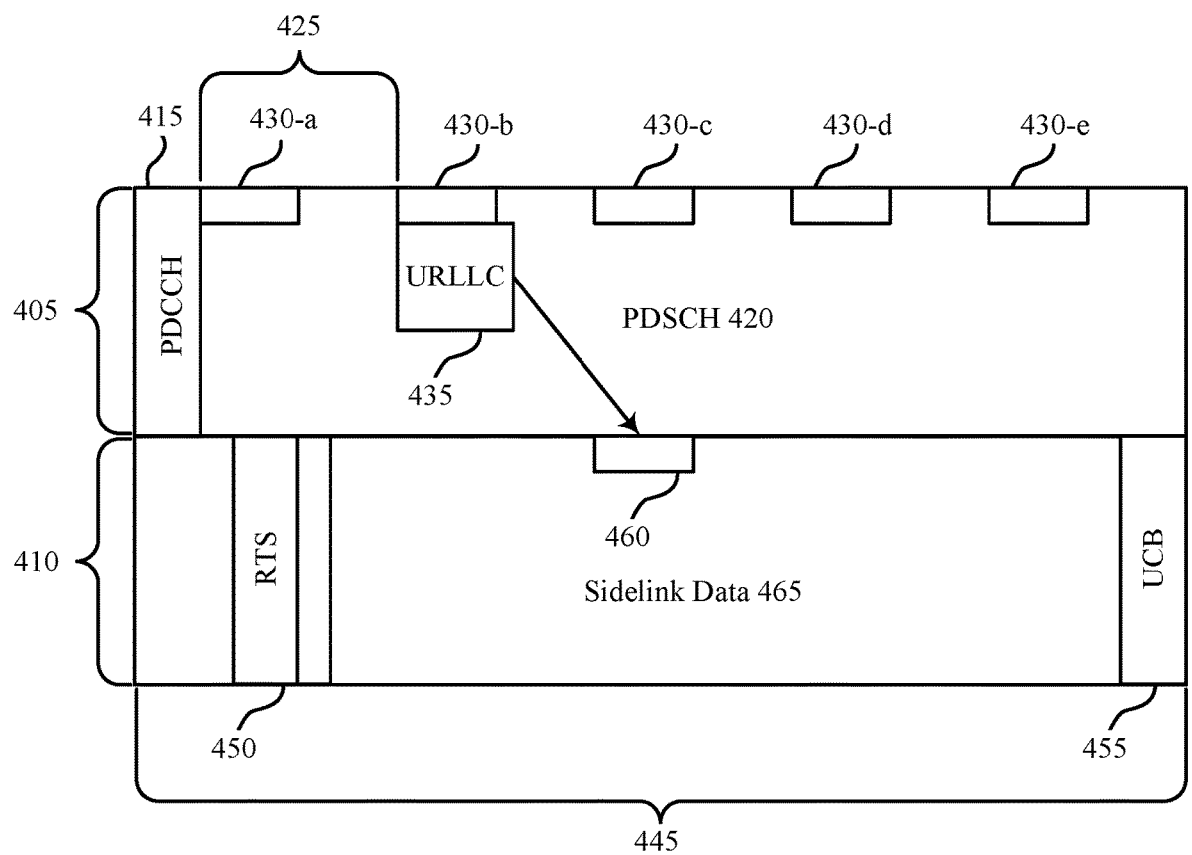
FIG. 4 illustrates an example of a wireless communication configuration that supports signaling for multiplexing of LLC and sidelink communications in accordance with aspects of the present disclosure.

FIG. 4 illustrates an example of a wireless communications configuration 400 that supports signaling for multiplexing of LLC and sidelink communications in accordance with various aspects of the present disclosure. In some cases, wireless communications configuration 400 may represent aspects of techniques performed by a UE 115 or base station 105 as described with reference to FIGS. 1-3. While FIG. 3 illustrates a static method for reserving resources, wireless communications configuration 400 may illustrate an example of a more dynamic method for reserving resources in sidelink transmissions for URLLC data.

Similar to the wireless communication configuration of FIG. 3, available resources in a geographic sector may be allocated between a downlink 405 and an uplink 410. Downlink 405 may include a PDCCH 415 and a PDSCH 420. In some examples, a gNB or a URLLC UE may have some URLLC data to transmit. In such examples, URLLC transmissions may correspond to a first duration TTI 425, wherein first duration TTI 425 may be a mini-slot consisting of two OFDM symbols similar to FIG. 3.

If a URLLC UE is located within the same geographic sector as a base station 105 (e.g., a gNB), base station 105 may assign an indication channel 430 to downlink 405 in each first duration TTI 425 similar to the indication channel described in FIG. 3. In some cases, base station 105 may transmit URLLC data 435. URLLC data 435 may puncture resources allotted to PDSCH 420. Indication channel 430 may carry an indicator which conveys the information that URLLC data 435 is or will be transmitted similar to the process described in FIG. 3.

A UE 115 may engage in D2D communication with another sidelink UE 115 via uplink 410 as described in FIG. 3. Sidelink UE 115 may receive a grant for sidelink data 465 via PDCCH 415. A subframe for transmission of sidelink data 465 on uplink 410 may correspond to a second duration TTI 445. In some examples, a subframe for uplink 410 may include (RTS) 450 and uplink common burst (UCB) 455 as described in FIG. 3.

In some examples, a URLLC UE 115 may receive URLLC data 435. Because URLLC data requires fast HARQ turn around, ACK/NACK feedback may be transmitted immediately following reception of URLLC data 435. ACK/NACK feedback may be bursty and unpredictable. Thus, sidelink UE 115 may monitor indication channel 430 in every first duration TTI 425 of second duration TTI 445 for the indicator. If sidelink UE 115 identifies the indicator, sidelink UE 115 may identify dedicated URLLC ACK/NACK resources 460 on uplink 410 for ACK/NACK feedback. URLLC ACK/NACK resources 460 may include one or more resources utilized for ACK/NACK feedback. Sidelink UE 115 may then empty the corresponding resources and reserve the identified URLLC ACK/NACK resources 460 for ACK/NACK feedback. URLLC UE 115 may receive URLLC data 435 and transmit URLLC ACK/NACK feedback via URLLC ACK/NACK resources 460. In some examples, sidelink UE 115 may empty URLLC ACK/NACK resources 460 for ACK/NACK feedback in a subsequent first duration TTI 425 that is not immediately following the first duration TTI 425 in which the indication was detected. By utilizing a static mode for URLLC ACK/NACK feedback, UE 115 may conserve resources for transmitting sidelink data 465. UE 115 may additionally conserve power. Sidelink UE 115 may utilize the static mode illustrated in FIG. 3 to maximize consistency of ACK/NACK feedback transmissions and the opportunities for transmitting ACK/NACK feedback. Or, sidelink UE 115 may utilize the dynamic mode illustrated in FIG. 4 to maximize efficiency of resource allocation and power.

In some examples, sidelink UE 115 may utilize a hybrid mode for reserving ACK/NACK resources. Sidelink UE 115 may determine whether to reserve resources every first duration TTI 425 in the static mode or empty resources in a single first duration TTI 425 in the dynamic mode based on the amount of URLLC traffic present. Base station 105 may transmit URLLC data in an unpredictable manner. In some cases, the URLLC traffic may be more constant. By reserving a resource in every first duration TTI 425, sidelink UE 115 and URLLC UE 115 may ensure the ACK/NACK feedback is transmitted. In other cases, the URLLC traffic may be bursty, and sidelink UE 115 may not need to reserve a resource every first duration TTI 425, thereby utilizing more resources for efficient sidelink transmissions. In these cases, sidelink UE 115 may dynamically empty URLLC ACK/NACK resources 460 for ACK/NACK feedback. Base station 105 may choose one mode or the other. Alternatively, base station 105 may monitor the amount of traffic, rate of traffic, constancy of traffic, quality of signal, etc. and may switch between the two methods based at least on the monitored data.

Sidelink UE may engage in signaling for multiplexing (e.g., signaling for sidelink/URLLC multiplexing) as discussed above with reference to FIGS. 3-4 when a base station 105 transmits URLLC data to a URLLC UE 115. Additional schemes are utilized, however, when a URLLC UE 115 punctures ongoing sidelink data transmissions with URLLC data for a base station.

Figure 5:
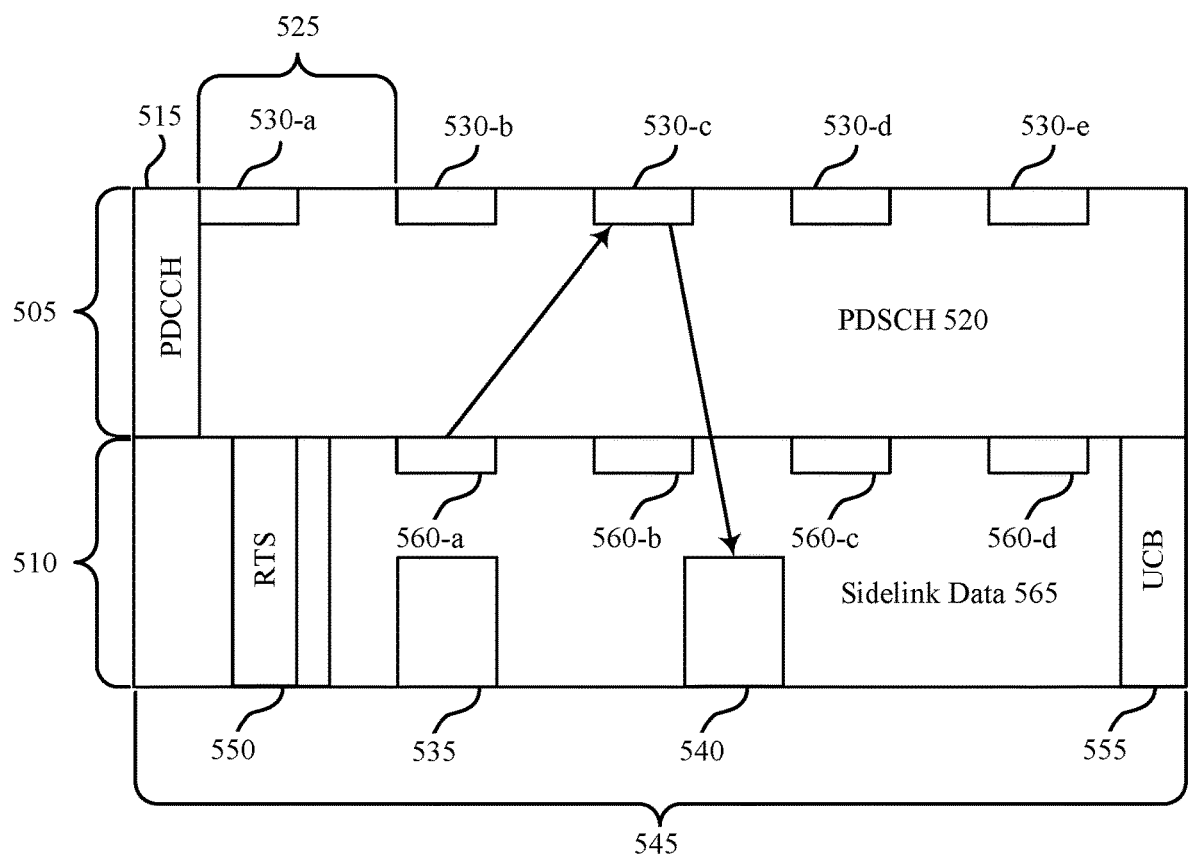
FIG. 5 illustrates an example of a wireless communication configuration that supports signaling for multiplexing of LLC and sidelink communications in accordance with aspects of the present disclosure.

FIG. 5 illustrates an example of a wireless communications configuration 500 that supports signaling for multiplexing of LLC and sidelink communications during uplink puncturing in accordance with various aspects of the present disclosure. Wireless communications configuration 500 may support signaling for Sidelink/URLLC when puncturing occurs on resources allotted for uplink communication. In some cases, wireless communications configuration 500 may represent aspects of techniques performed by a UE 115 or base station 105 as described with reference to FIGS. 1-4.

In some cases, available resources in a geographic sector may be allocated between downlink 505 and uplink 510. Downlink 505 may include a PDCCH 515 and a PDSCH 520. In some cases, base station 105 and URLLC UE 115 may have some URLLC data to transmit. URLLC transmissions may correspond to a first duration TTI 525. In some cases first duration TTI 525 may be a mini-slot. In such cases, first duration TTI 525 may include two OFDM symbols.

If a URLLC UE is located within the same geographic sector as a base station 105 (e.g., a gNB) base station 105 may assign an indication channel 530 to downlink 505. Indication channel 530 may be assigned to each first duration TTI 525 of downlink 505. For example, indication channel 530-*a* may be assigned to a first duration TTI 525, indication channel 530-*b* may be assigned to another first duration TTI 525, and so forth. Indication channel 530 may include an indicator, which may convey information on the presence of URLLC traffic. Indication channel 530 may also carry a scheduling grant.

A UE 115 may engage in D2D communication with another sidelink UE 115 via uplink 510. In some cases, sidelink communication may include a broadcast transmissions, from one sidelink UE 115 to multiple sidelink UEs 115. Sidelink UE 115 may receive or identify a grant for a transmission of URLLC data via PDCCH 315. A subframe for transmission of URLLC data 540 on uplink 510 may correspond to a second duration TTI 545. For example, second duration TTI 545 may be a slot, or may be greater than or equal to 500 microseconds. In some examples, a subframe for uplink 510 may include (RTS) 550, and uplink common burst (UCB) 555. RTS 550 may include a group destination identifier, a duration of transmission, a RS to enable channel estimation and receiver yielding, and an MCS indicator. UCB 555 may enable all UEs to perform an uplink report.

In some examples, a URLLC UE 115 may have URLLC data 535 to transmit to a base station. The URLLC UE may puncture the resources allocated to sidelink data 565 to immediately transmit the URLLC data 535 in a first uplink transmission in a grant-less fashion. In some cases, sidelink data 565 may cause some interference at base station 105, and it may be beneficial to retransmit URLLC data 535 in a second uplink transmission. Sidelink UE 115 may reserve dedicated SR resources 560 for transmission of a SR. In some examples, sidelink UE 115 may reserve one or more SR resources 560 in every first duration TTI 525 following the transmission of URLLC data 535 in a first transmission. The URLLC UE 115 may transmit a SR on the reserved SR resources 560-*a* while simultaneously (in some cases) transmitting the URLLC data 535. Base station 105 may detect and decode the SR on the dedicated SR resource 560. If the first transmission fails (e.g., due to interference between the puncturing URLLC data 535 and the punctured sidelink data 565), base station 105 may transmit an indicator on indication channel 530 including a scheduling grant to schedule a second transmission in response to the SR. URLLC UE 115 may receive the scheduling grant and retransmit URLLC data 540 in a second, later transmission. In some examples, URLLC data 540 may be the same as URLLC data 535. In other examples, URLLC data 540 may be different from URLLC data 535. Sidelink UE 115 may monitor indication channel 530 in every first duration TTI 525. If the retransmission scheduling grant is detected on indication channel 530, sidelink UE 115 may suspend ongoing sidelink transmissions in the resources allocated for the second transmission to accommodate URLLC traffic.

For example, sidelink UE 115 may monitor indication channel 530-*a* and not detect a retransmission scheduling grant or an indicator. However, sidelink UE 115 may identify an indicator on indication channel 530-*b* indicating the presence of URLLC data, and may reserve SR resources 560. In some examples, while transmitting URLLC data 535 in a first transmission, URLLC UE 115 may transmit a SR via reserved SR resources 560-*a*. In other examples, after or before transmitting URLLC data 535 in a first transmission, URLLC UE 115 may transmit a SR via reserved SR resources 560-*a*. URLLC data 535 may not be successfully received or decoded by base station 105, and base station 105-*a* may transmit an indicator including a retransmission scheduling request on indication channel 530-*c*. The retransmission scheduling grant may indicate resources for the retransmission of URLLC data (e.g., URLLC data 540). Sidelink UE 115 may detect the retransmission scheduling grant and temporarily suspend the transmission of sidelink data 565 in the resources allocated for the retransmission of URLLC data.

Figure 6:
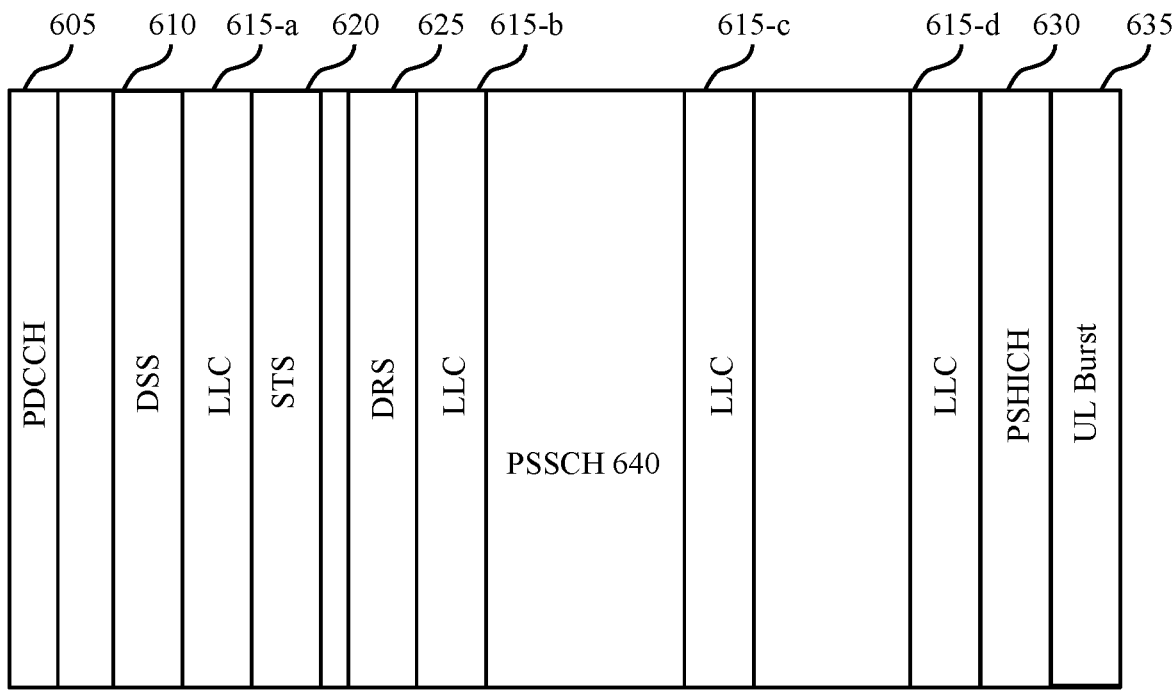
FIG. 6 illustrates an example of a wireless communication configuration that that supports signaling for multiplexing of low latency communication and sidelink communications in accordance with aspects of the present disclosure.

FIG. 6 illustrates an example of a subframe 600 for signaling for communicating LLC and sidelink communications in TDD systems in accordance with various aspects of the present disclosure. Subframe 600 may include communications between a base station 105, a sidelink UE 115, and an LCC (e.g., URLLC) UE 115, which may be examples of or which may represent aspects of techniques performed by a UE 115 or base station 105 as described with reference to FIGS. 1-5. Subframe 600 may include the reservation of LLC TTIs.

In some cases, a wireless communications system may allocate resources according to a TDD scheme. For example, a subframe 600 may utilize individual TTIs (e.g., symbols) to transmit or receive different signals. In one example, a subframe may include symbols reserved for a PDCCH 605, DSS 610, STS 620, DRS 625, PSHICH 630 and UL Burst 635. Other available resources may be allocated to sidelink traffic on PSSCH 640.

In some cases, a base station 105 may transmit URLLC data to a URLLC UE. Alternatively, a URLLC UE may have URLLC data to transmit to the base station. In such examples, base station 105 may identify resources for LLC transmissions, such as LLC resources 615. Base station 105 may include an indication of the reserved resources in a downlink control channel, such as PDCCH 605. A Sidelink UE may identify the reserved LLC resources 615 based on the received PDCCH 605. During the reserved LLC resources 615, the sidelink UE 115 may suspend sidelink communication on PSSCH 640. A URLLC UE 115 may transmit uplink URLLC traffic or receive downlink URLLC traffic on the LLC resources 615.

In some cases, a base station 105 or a UE 115 may determine to identify and reserve LLC resources 615 based on the duration of URLLC traffic requirements. For instance, where URLLC access corresponds to a short duration (e.g., one or two symbols), the base station 105 or UE 115 may proceed to reserve LLC resources 615.

In some examples, a UE 115 may identify and reserve LLC resources 615 based at least in part on gaps in sidelink signaling. That is, PSSCH 640 may include resources scheduled for sidelink communications, and may include allocated gaps between transmissions. For example, A gap may exist between DSS 610 and STS 615. Thus, when base station 105 indicates in PDCCH 605 the resources reserved for LLC traffic, a sidelink UE 115 may identify and reserve LLC resources 615-*a* in the gap between DSS 610 and STS 615. By scheduling the reserved LLC resources 615, a base station 105 and UE 115 may avoid a scenario in which URLLC transmissions are not successfully received or decoded due to interference from sidelink transmissions on the same resources. Additionally, by utilizing gaps in sidelink traffic, a sidelink UE 115 may reduce the impact of LLC traffic on the PSSCH 640. Such gaps may be identified at multiple locations within the subframe, and may be utilized to identify and reserve LLC resources 615-*b*, LLC resources 615-*c*, and LLC resources 615-*d*.

In some examples, the LLC resource reservation scheme may be utilized in systems wherein LLC traffic is common, occurs regularly, or occurs in transmissions with a duration of no more than two symbols. Alternatively, in scenarios where LLC traffic is more bursty, or has a longer duration (e.g., more than two symbols) a different scheme may be utilized.

Figure 7:
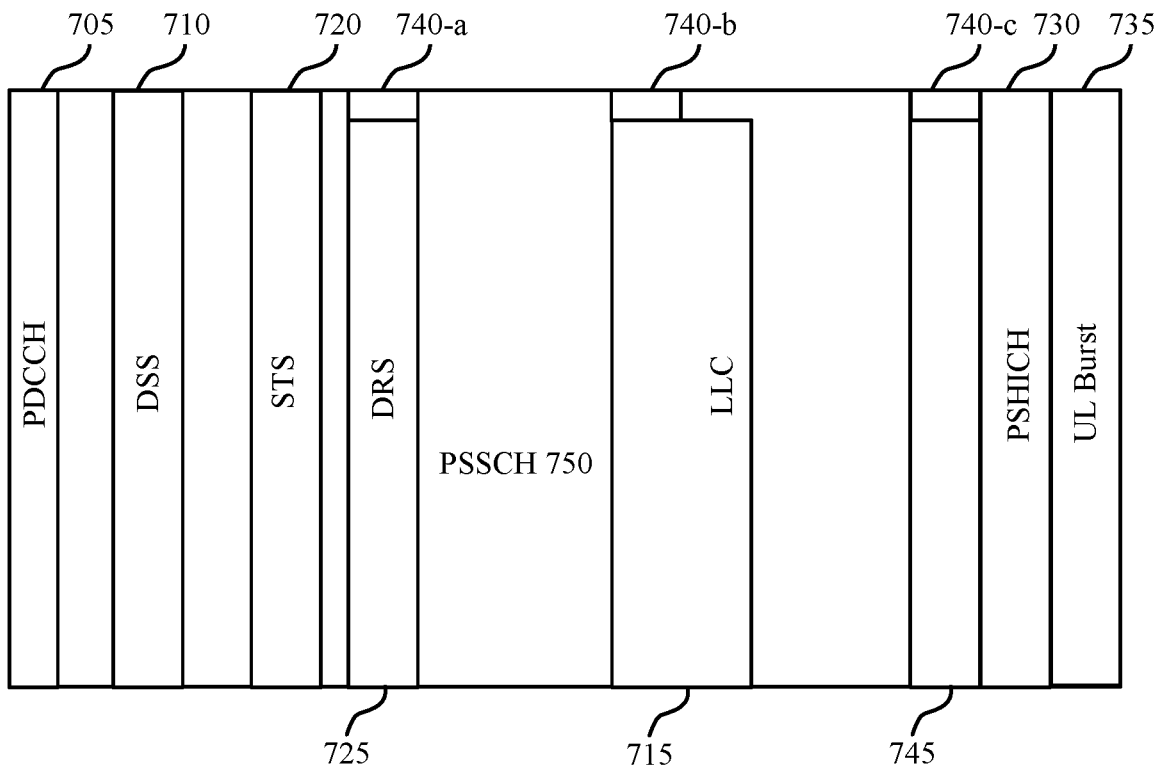
FIG. 7 illustrates an example of a wireless communication configuration that supports signaling for multiplexing of low latency communication and sidelink communications in accordance with aspects of the present disclosure.

FIG. 7 illustrates an example of a subframe 700 for signaling LLC and sidelink communications in TDD systems in accordance with various aspects of the present disclosure. Subframe 700 may include communications between a base station 105, a sidelink UE 115, and an LCC (e.g, URLLC) UE 115, which may be examples of or which may represent aspects of techniques performed by a UE 115 or base station 105 as described with reference to FIGS. 1-6. Subframe 700 may include an indicator channel and corresponding reserved resources.

In some cases, a wireless communications system may allocate resources according to a TDD scheme, wherein a subframe 700 may utilize individual TTIs (e.g., symbols) to transmit or receive different signals. Similarly to the subframe structure shown in FIG. 6, a subframe 799 may include symbols reserved for PDCCH 705, DSS 710, STS 720, PSHICH 730, and UL burst 735. Other available resources may be allocated to sidelink traffic on PSSCH 750.

In some cases, a base station 105 may transmit URLLC data to a URLLC UE. Alternatively, a URLLC UE may have URLLC data to transmit to the base station. In some cases, LLC transmissions may have a long duration (e.g., more than two symbols) or may be bursty in nature. In such cases, the reservation of regular explicit reservation of symbols may have a high overhead. Instead, an indicator channel 740 may be reserved.

Indicator channel 740 may carry an override signal in the case where an LLC transmission is imminent. A sidelink UE 115 may defer the resources of a given TTI (e.g., symbol) corresponding to an indicator channel. For example, a sidelink UE 115 may determine not to transmit during sidelink resources 745 corresponding to indicator channel 740-*c*.

Sidelink channel transmissions may include a sufficient switch-over time before each indicator channel to enable reception of indicator channel 740. If an indicator channel indicates LLC transmissions, then corresponding sidelink channel resources are emptied to avoid interference with the LLC transmissions. Alternatively, if no LLC transmissions are indicated in the indicator channel 740, then a sidelink UE 115 may resume transmissions in the following symbols. For instance, if a sidelink UE 115 monitors indicator channel 740-*b* and determines that LLC data 715 is to be transmitted by a base station 105 to a URLLC UE 115, then sidelink UE 115 will cease transmissions during the symbols corresponding to LLC data 715. Sidelink UE 115 will continue to monitor, and will cease transmissions during resources 745 to monitor indicator channel 740-*c*. Upon determining that no LLC data is to be transmitted, sidelink UE 115 will resume communications during PSHICH symbol 730, and will transmit UL burst 735.

Figure 8:
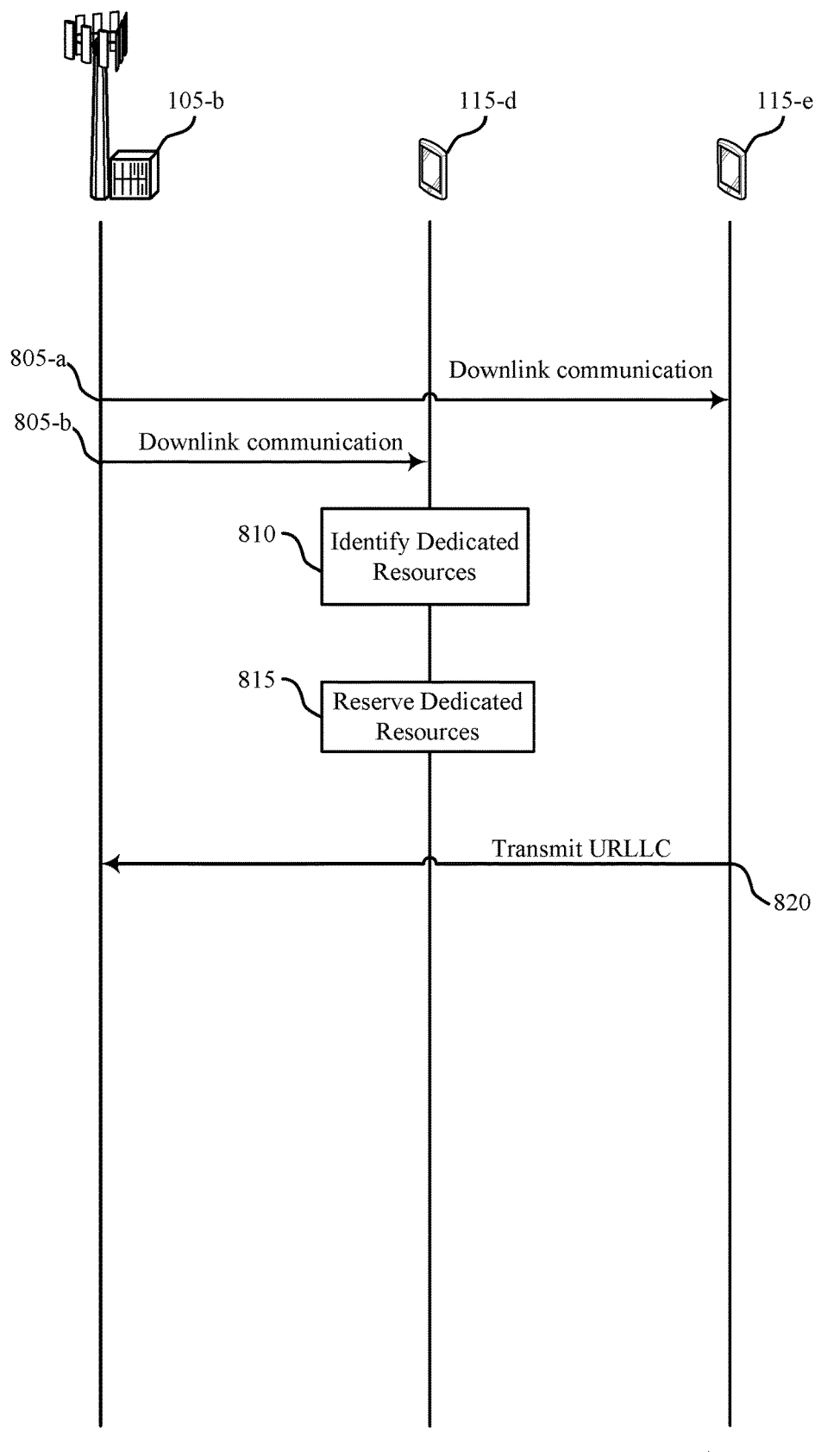
FIG. 8 illustrates an example of a process flow for signaling for multiplexing of low latency communication and sidelink communications in accordance with aspects of the present disclosure.

FIG. 8 illustrates an example of a process flow 800 for signaling LLC and sidelink communications in TDD systems in accordance with various aspects of the present disclosure. Process flow 800 may include base station 105-*b*, sidelink UE 115-*d*, and URLLC UE 115-*e*, which may be examples of or which may represent aspects of techniques performed by a UE 115 or base station 105 as described with reference to FIGS. 1-7. Process flow 800 may include the transmission of URLLC data from base station 105-*b*, identifying dedicated resources for LLC communication, and reserving the dedicated resources.

At 805-*a* and 805-*b*, base station 105-*c* may transmit a downlink communication. In some examples, UE 105-*c* may broadcast the downlink communication such that all UEs 115, including sidelink UE 115-*d* and URLLC UE 115-*e*, receive the downlink control signal. Alternatively, base station 105-*c* may transmit the downlink control signal individually to UE 115-*fd* and UE 115-*e*. In some examples, the downlink communication may be a PDCCH, and may have a first duration TTI (e.g., one or more symbols). The downlink communication may include information identifying dedicated resources in a sidelink channel for low latency communications (e.g., URLLC traffic). the URLLC traffic may utilize a TTI that is shorter than the TTI of the downlink control signal (e.g., a slot or a mini-slot).

At 810, a sidelink UE 115-*d* may receive a the downlink wireless communication of 805-*a*. UE 115-*d* may identify dedicated resources in the sidelink channel for performing D2D wireless communications that use the second duration TTI (e.g., sidelink data transmissions). The downlink wireless communication of 805-*a* may be received in a downlink control channel of a frame, a subframe or a slot that corresponds to the dedicated resources.

In some examples, UE 115-*d* may determine that communications having the first TTI (URLLC traffic) will utilize two or less first duration TTIs, and may identify the resources based thereon. In some examples, the identified dedicated resources may be determined based on scheduled gaps in the sidelink channel. That is, UE 105-*d* or UE 115-*d* may identify scheduled gaps in the sidelink channel, and may identify the dedicated resources based on the location of the gaps. For instance, the dedicated resources in the sidelink channel may be identified as being immediately following the gaps. In some examples, UE 115-*d* may identity a TDD pattern, and may determine whether the URLLC traffic is uplink traffic or downlink traffic based at least in part on the identified TDD pattern.

At 815, sidelink UE 115-*d* may reserve resources for transmissions having the first TTI duration. For example, transmissions having the first TTI may be URLLC traffic. At 820, URLLC UE 115-*e* may transmit URLLC data to base station 105-*b* utilizing the reserved dedicated uplink resources.

Figure 9:
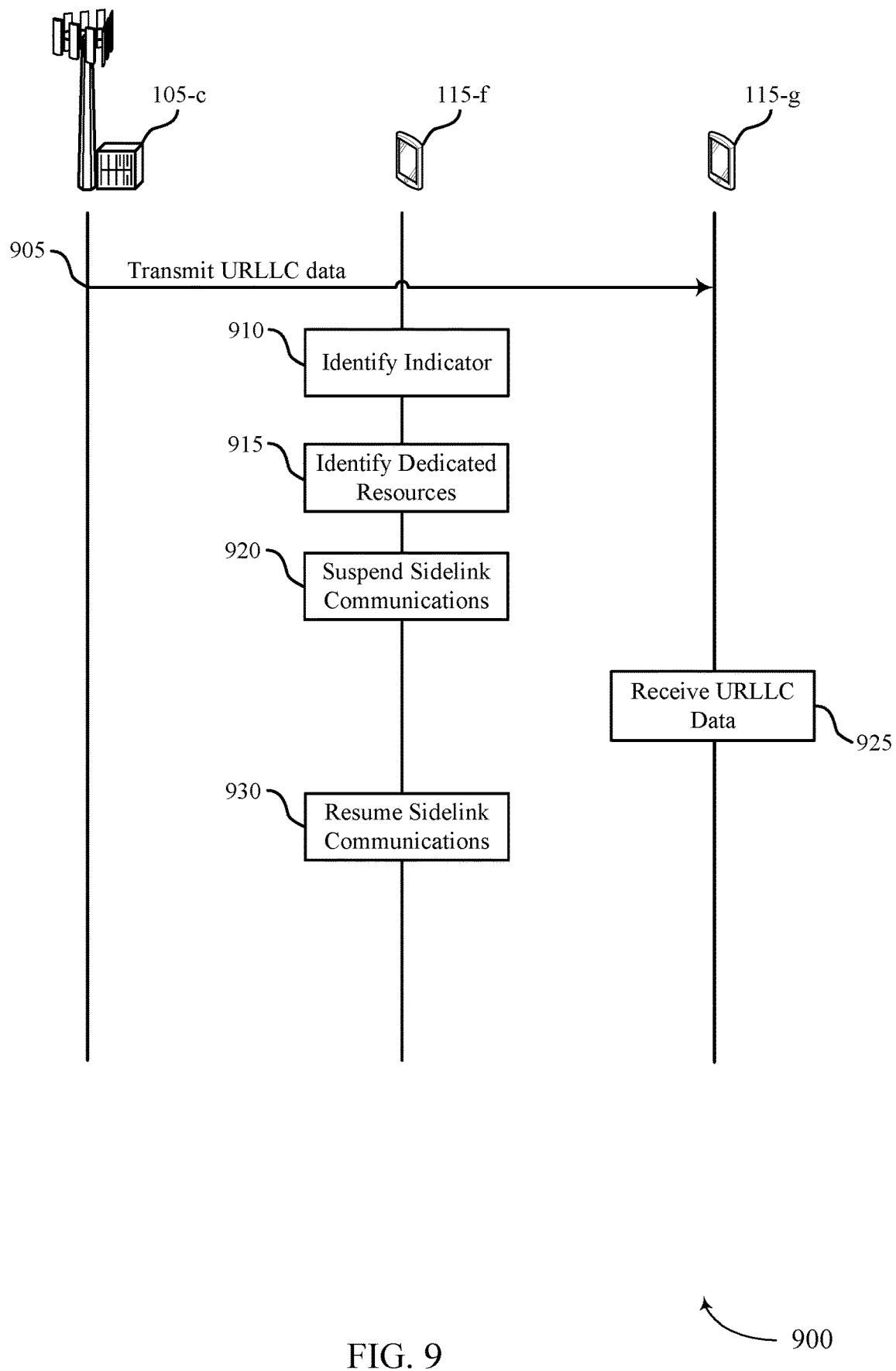
FIG. 9 illustrates an example of a process flow for signaling for multiplexing of low latency communication and sidelink communications in accordance with aspects of the present disclosure.

FIG. 9 illustrates an example of a process flow 900 for signaling LLC and sidelink communications in TDD systems in accordance with various aspects of the present disclosure. Process flow 900 may include base station 105-*c*, sidelink UE 115-*f*, and URLLC UE 115-*g*, which may be examples of or which may represent aspects of techniques performed by a UE 115 or base station 105 as described with reference to FIGS. 1-8. Process flow 900 may include the transmission of LLC data and an indicator channel from base station 105-*c*, identifying dedicated resources dedicated resources for LLC communication, and reserving the dedicated resources.

At 905, base station 105-*c* may transmit URLLC data to URLLC UE 115-*g*. Additionally, Base station 105-*c* may broadcast an indicator associated with wireless communications having a first duration TTI (e.g., URLLC traffic).

At 910 UE 115-*f* may identify the indicator associated with URLLC traffic while performing D2D wireless communications in a sidelink channel used for second duration TTI transmissions (sidelink transmissions). First duration TTIs may be shorter than second direction TTIs.

At 915, UE 115-*f* may identify dedicated resources in the sidelink channel for low latency communications (URLLC communications) based at least in part on identifying the indicator. In some cases, base station 105-*c* or UE 115-*g* may determine that LLC traffic will utilize more than two first duration TTIs, and may identify the indicator based on the determination. At 920, UE 115-*f* may suspend sidelink communications in the sidelink channel during the resources identified at 915.

At 925, URLLC UE 115-*g* may receive URLLC data. Alternatively, UE 115-*g* may transmit URLLC data (not shown). In some examples, UE 11*t*-*g* may identify a TDD pattern, and may determine whether LLC traffic is uplink or downlink traffic base at least in part on the determined pattern. At 930, sidelink UE 115-*f* may determine that the URLLC transmissions on the identified resources has been performed, and may resume sidelink communication on the sidelink channel.

Figure 10:
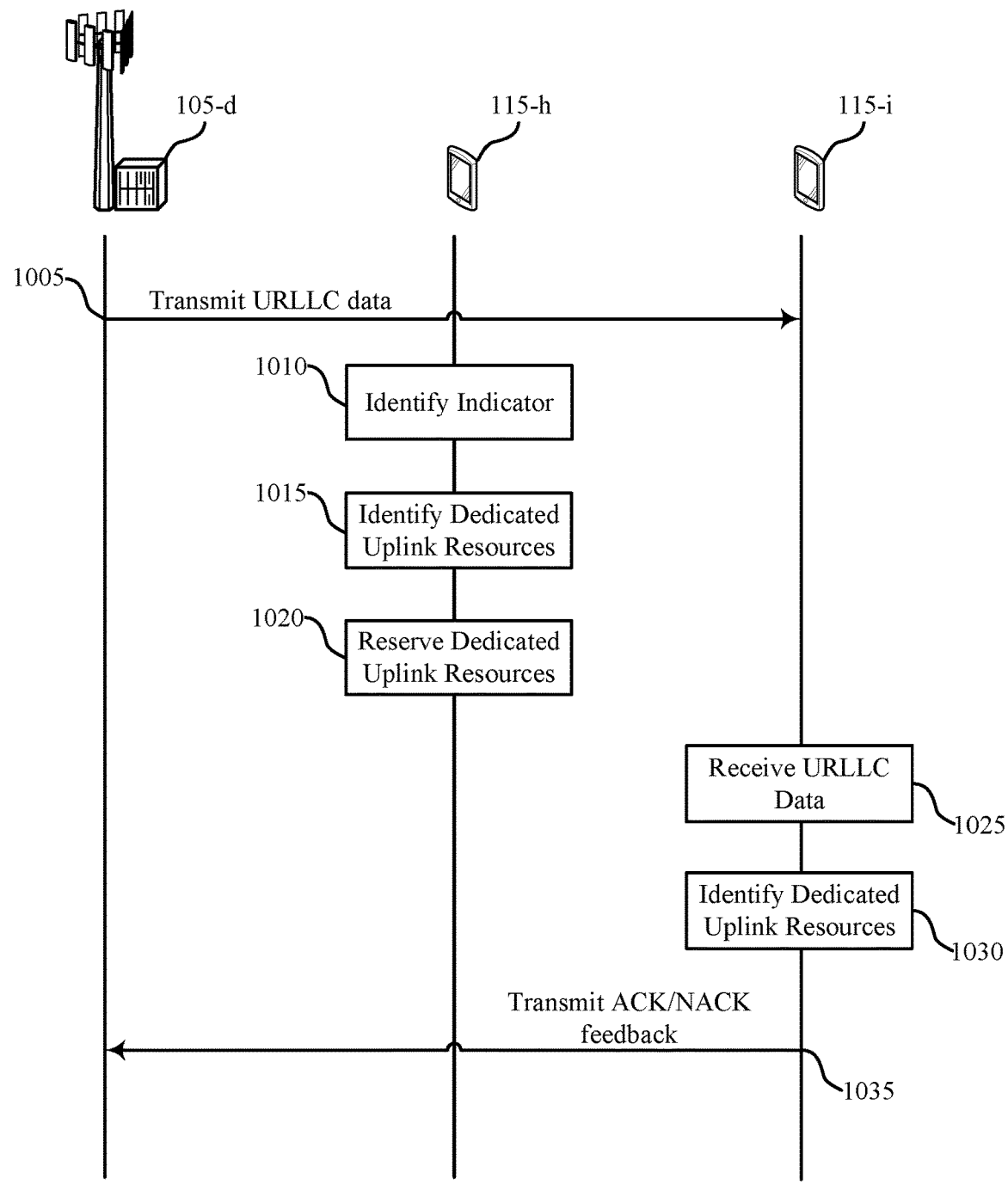
FIG. 10 illustrates an example of a process flow for signaling for multiplexing of LLC and sidelink communications in accordance with aspects of the present disclosure.

FIG. 10 illustrates an example of a process flow 1000 for signaling for multiplexing of LLC and sidelink communications in accordance with various aspects of the present disclosure. Process flow 1000 may include base station 105-*d*, sidelink UE 115-*h*, and URLLC UE 115-*i*, which may be examples of or which may represent aspects of techniques performed by a UE 115 or base station 105 as described with reference to FIGS. 1-9. Process flow 1000 may include the transmission of URLLC data from base station 105-*d*, reserving resources on sidelink transmissions by sidelink UE 115-*h*, and transmission of an ACK/NACK feedback by URLLC UE 115-*e*.

Base station 105-*d* may send a first URLLC transmission 605 to URLLC UE 115-*e*. The first URLLC transmission 1005 may puncture resources allotted to PDSCH. Base station 105-*b* may reserve an indication channel in downlink transmissions to convey the presence of URLLC data. Base station 105-*d* may assign the indication channel to first duration TTI. The first duration TTI may include two symbols (e.g., a mini-slot) in downlink transmissions, and in some examples base station 105-*d* may assign the indication channel to the first of the two symbols. Base station 105-*d* may transmit the indication channel in each successive first duration TTI. The indication channel may include an indicator comprising information on the presence of URLLC traffic, the location of URLLC transmission, and other information associated with URLLC. Base station 105-*d* may require URLLC UE 115-*e* to transmit an ACK/NACK message immediately following first URLLC transmission 1005.

At block 1010, sidelink UE 115-*d* may identify the indicator transmitted by base station 105-*d* conveying the presence of URLLC transmission 1005. The indicator may be associated with a first duration TTI (e.g., a mini-slot), while sidelink UE 115-*h* may perform D2D wireless communications with other sidelink UEs 115 in the sidelink channel using a slot that is greater than or equal to 500 microseconds. The slot may include a second duration TTI. The first duration may be shorter than the second duration TTI. Sidelink UE 115-*d* may monitor the indication channel in a plurality of successive first duration TTIs to identify a presence of URLLC data (e.g., low latency traffic). Further, sidelink UE 115-*d* may monitor the indication channel in each first duration TTI in a plurality of successive first TTIs to determine a traffic profile for the URLLC data. The traffic profile may include at least one of the group including a traffic rate, a traffic level of reliability requirement, and an amount of URLLC traffic during a period of time.

At block 1015, sidelink UE 115-*h* may identify dedicated uplink resources for ACK/NACK feedback based at least in part on identifying the indicator at block 610. Sidelink UE 115-*d* may monitor the indication channel from base station 105-*b*.

At block 1020, sidelink UE 115-*h* may reserve the identified dedicated uplink resources from block 1015 for a transmission of ACK/NACK feedback to base station 105-*d*. Sidelink UE 115-*e* may determine to use a first mode or a second mode in reserving the dedicated uplink resources based on the traffic profile determined in block 1010. The first mode may include reserving resources in each first duration TTI in a plurality of successive first TTIs as described in FIG. 3. The second mode may include reserving resources in a single first duration TTI as described in FIG. 4. The single first duration TTI may include a subset of first duration TTIs in a plurality of successive first duration TTIs. Sidelink UE 115-*e* may determine the subset based on the monitoring of the indication channel identifying the presence of URLLC data. Sidelink UE 115-*e* may empty the determined reserved dedicated uplink resources. Sidelink UE 115-*e* may empty at least one of the first duration TTIs in the plurality of successive first TTIs. Sidelink UE 115-*e* may decide which first duration TTI to empty based at least in part on the identified presence of URLLC data from the monitoring of the indication channel.

At block 1025, URLLC UE 115-*e* may receive the URLLC data from URLLC transmission 1005. The URLLC data may include a downlink wireless communication having a first duration TTI. At block 1030, URLLC UE 115-*e* may identify dedicated uplink resources in a sidelink channel for ACK/NACK feedback. The dedicated uplink resources may be based at least in part on receiving the URLLC data at block 1025. Further, the dedicated uplink resources may be similar to the dedicated uplink resources identified in block 1015 and reserved in block 1020 by sidelink UE 115-*h*. The sidelink channel may use a second duration TTI, wherein the first duration TTI is shorter than the second duration TTI.

URLLC UE 115-*i* may transmit the ACK/NACK feedback 1035 to base station 105-*b*. URLLC UE 115-*i* may transmit the ACK/NACK feedback 1035 utilizing the reserved dedicated uplink resources determined from block 1020. The dedicated uplink resources may include the emptied resources from block 1020.

Figure 11:
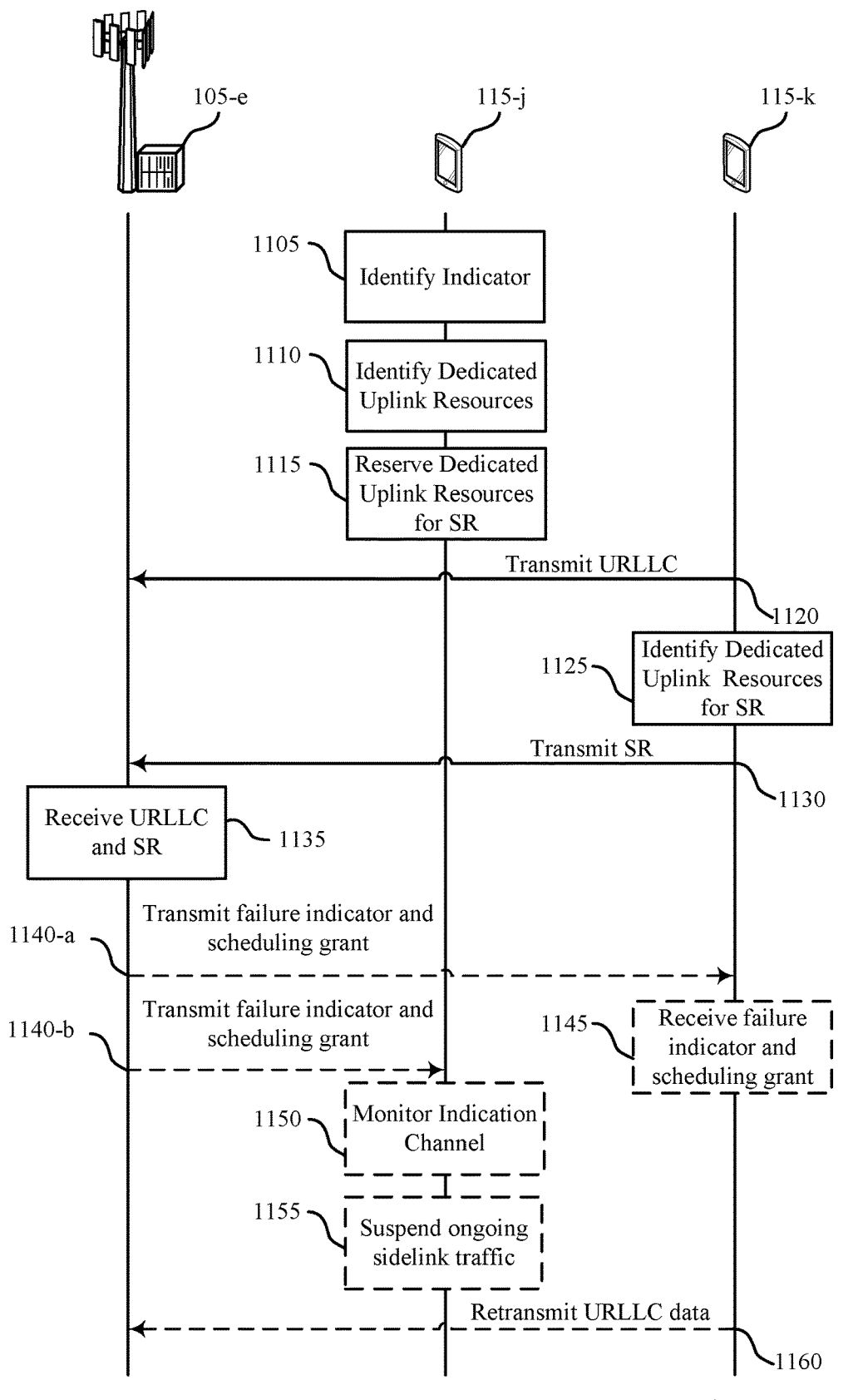
FIG. 11 illustrates an example of a process flow for signaling for signaling for multiplexing of LLC and sidelink communications in accordance with aspects of the present disclosure.

FIG. 11 illustrates an example of a process flow 1100 for signaling for multiplexing of LLC and sidelink communications in accordance with various aspects of the present disclosure. Process flow 1100 may include base station 105-*e*, sidelink UE 115-*j*, and URLLC UE 115-*k*, which may be examples of or which may represent aspects of techniques performed by a UE 115 or base station 105 as described with reference to FIGS. 1-10. Process flow 1100 may include reserving resources on sidelink transmissions by sidelink UE 115-*j*, a transmission of URLLC data and a SR from URLLC UE 115-*j*, and a transmission of a failure indicator and a scheduling grant by base station 105-*e*.

At block 1105, sidelink UE 115-*j* may identify an indicator transmitted by base station 105-*e* conveying the presence of URLLC traffic. The indicator may be associated with a first duration TTI (e.g., a mini-slot), while sidelink UE 115-*j* may perform D2D wireless communications with other sidelink UEs 115 in the sidelink channel using a slot that is greater than or equal to 500 microseconds. The slot may include a second duration TTI. The first duration may be shorter than the second duration TTI.

At block 1110, sidelink UE 115-*f* may identify dedicated uplink resources for scheduling requests (SRs). At block 715, sidelink UE 115-*j* may reserve the identified dedicated uplink resources from block 1110 for a transmission of SRs. The dedicated uplink resources may include a first duration TTI in the sidelink channel. In some examples, the dedicated uplink resources may include a resource in each first duration TTI (e.g., a mini-slot) in a plurality of successive first TTIs. In some examples, the dedicated uplink resources may include a resource in a single first duration TTI. The single first duration TTI may include a subset of first duration TTIs in a plurality of successive first duration TTIs.

URLLC UE 115-*k* may send URLLC transmission 1120 to base station 105-*c*. URLLC transmission 1120 may include a low latency communication. URLLC UE 115-*g* may send URLLC transmission 1120 before receiving a scheduling grant. URLLC transmission 1120 may have a first duration TTI in a sidelink channel. The sidelink channel may be configured to have a second duration TTI, wherein the first duration TTI is shorter than the second duration TTI. URLLC transmission 1120 may puncture sidelink channel communications.

At block 1125, URLLC UE 115-*k* may identify the dedicated uplink resources reserved for SRs from blocks 710 and 715. URLLC UE 115-*k* may send a SR transmission 1130 to base station 105-*e*. URLLC UE 115-*g* may send SR transmission 1130 utilizing the dedicated uplink resources identified in block 1125. At block 1135, base station 105-*e* may receive and detect the URLLC transmission 1120 and SR transmission 1130. Base station 105-*e* may not receive the URLLC transmission 1120 correctly due to interference between the URLLC data and the punctured data in the sidelink channel.

If base station 105-*e* fails to decode or receive the URLLC data correctly, base station 105-*e* may send a failure indicator and scheduling grant transmission 740-*a* to URLLC UE 115-*g* via an indicator channel. Base station 105-*e* may also transmit failure indicator and scheduling grant transmission 1140-*b* to sidelink UE 115-*j* via an indicator channel. In some examples, base station 105-*e* may broadcast one indicator and scheduling grant transmission (an indicator and scheduling grant transmission combining s indicator and scheduling grant transmission 1140-*a* and indicator and scheduling grant transmission 1140-*b*) on the indication channel such that both sidelink UE 115-*j* and URLLC UE 115-*k* may receive the indicator and scheduling grant by monitoring the indication channel. At block 1145, URLLC UE 115-*k* may receive the failure indicator and scheduling grant transmission 1140. URLLC UE 115-*k* may receive the failure indicator and scheduling grant during the same transmission.

At block 1150, sidelink UE 115-*j* may monitor an indication channel from base station 105-*e* in each first duration TTI in a plurality of successive first TTIs. At block 1155, sidelink UE 115-*j* may suspend ongoing sidelink traffic if a scheduling grant is detected while monitoring the indication channel in block 1150. Sidelink UE 115-*j* may suspend the ongoing sidelink traffic during a single first duration TTI in the plurality of successive first TTIs. The single first duration TTI may include a next first duration TTI in the plurality of successive first TTIs. Sidelink UE 115-*j* may suspend the sidelink traffic based on detecting the scheduling grant.

URLLC UE 115-*k* may send a URLLC retransmission 1160 to base station 105-*e*. URLLC retransmission 1160 may have a first duration TTI. URLLC UE 115-*k* may send the URLLC retransmission 1160 based at least in part on the scheduling grant received in block 1145.

Figure 12:
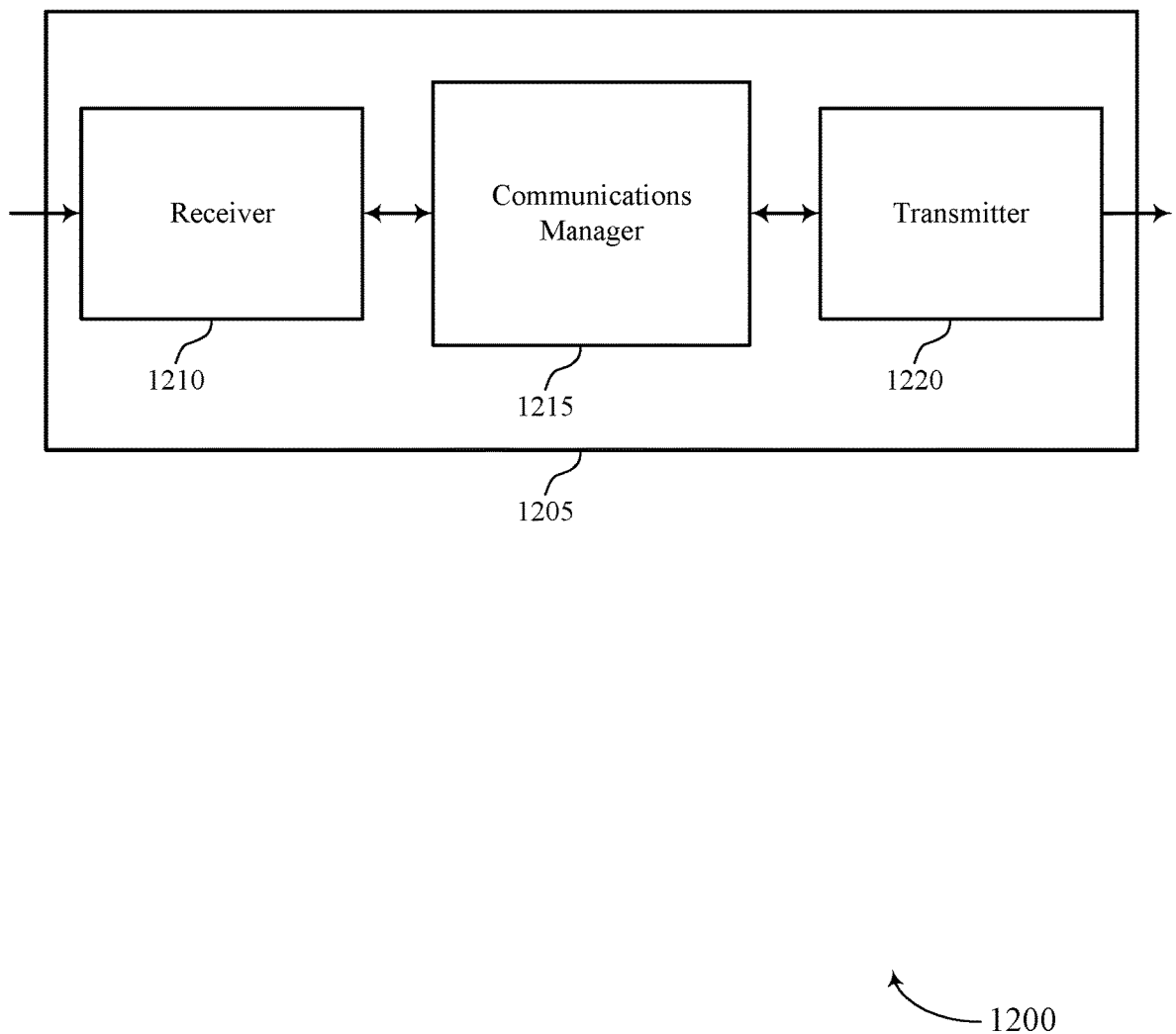
FIGS. 12 through 14 show block diagrams of a device that supports signaling for multiplexing of low latency communication and sidelink communications in accordance with aspects of the present disclosure.

FIG. 12 shows a block diagram 1200 of a wireless device 1205 that supports signaling for multiplexing of low latency communication and sidelink communications in accordance with aspects of the present disclosure. Wireless device 1205 may be an example of aspects of a user equipment (UE) 115 as described herein. Wireless device 1205 may include receiver 1210, communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to signaling for multiplexing of low latency communication and sidelink communications, etc.). Information may be passed on to other components of the device. The receiver 1210 may be an example of aspects of the transceiver 1535 described with reference to FIG. 15. The receiver 1210 may utilize a single antenna or a set of antennas.

Communications manager 1215 may be an example of aspects of the communications manager 1515 described with reference to FIG. 15.

Communications manager 1215 and/or at least some of its various sub-components may be implemented in hardware, software executed by a processor, firmware, or any combination thereof. If implemented in software executed by a processor, the functions of the communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1215 and/or at least some of its various sub-components may be physically located at various positions, including being distributed such that portions of functions are implemented at different physical locations by one or more physical devices. In some examples, communications manager 1215 and/or at least some of its various sub-components may be a separate and distinct component in accordance with various aspects of the present disclosure. In other examples, communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1215 may identify an indicator associated with wireless communications having a first duration TTI in a sidelink channel while performing D2D wireless communications in the sidelink channel using a second duration TTI, where the first duration TTI is shorter than the second duration TTI, receive a downlink wireless communication having the first duration TTI, where the downlink wireless communication is received according to a FDD configuration, identify dedicated uplink resources for acknowledgement/negative acknowledgment (acknowledgement (ACK)/negative acknowledgement (NACK)) feedback based on identifying the indicator, receiving the downlink wireless communication, or both, and reserve the dedicated uplink resources for a transmission of ACK/NACK feedback to a base station. The communications manager 1215 may also perform wireless uplink communications having a first duration TTI in a sidelink channel, the sidelink channel also configured for wireless communications having a second duration TTI, where the first duration TTI is shorter than the second duration TTI, identify an indicator associated with the wireless uplink communications, identify dedicated uplink resources for scheduling requests (SRs) for wireless uplink communications having the first duration TTI in the sidelink channel, reserve the dedicated uplink resources for a transmission of SRs for wireless uplink communications having the first duration TTI, and transmit a SR to a base station using the dedicated uplink resources in the sidelink channel. The communications manager 1215 may also receive a downlink wireless communication according to a TDD configuration, identify dedicated resources for transmission having a first duration TTI in a sidelink channel based on receiving the downlink wireless communication, where the sidelink channel is for performing D2D wireless communications using a second duration TTI, and where the first duration TTI is shorter than the second duration TTI, and reserve the dedicated resources for transmissions having the first TTI. The communications manager 1215 may also identify an indicator associated with wireless communications having a first duration TTI in a sidelink channel while performing D2D wireless communications in a sidelink channel using a second duration TTI transmissions, where the first duration TTI is shorter than the second duration TTI, identify dedicated resources in the sidelink channel for low latency communications based on identifying the indicator, and suspend sidelink communications in the sidelink channel during the identified resources.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
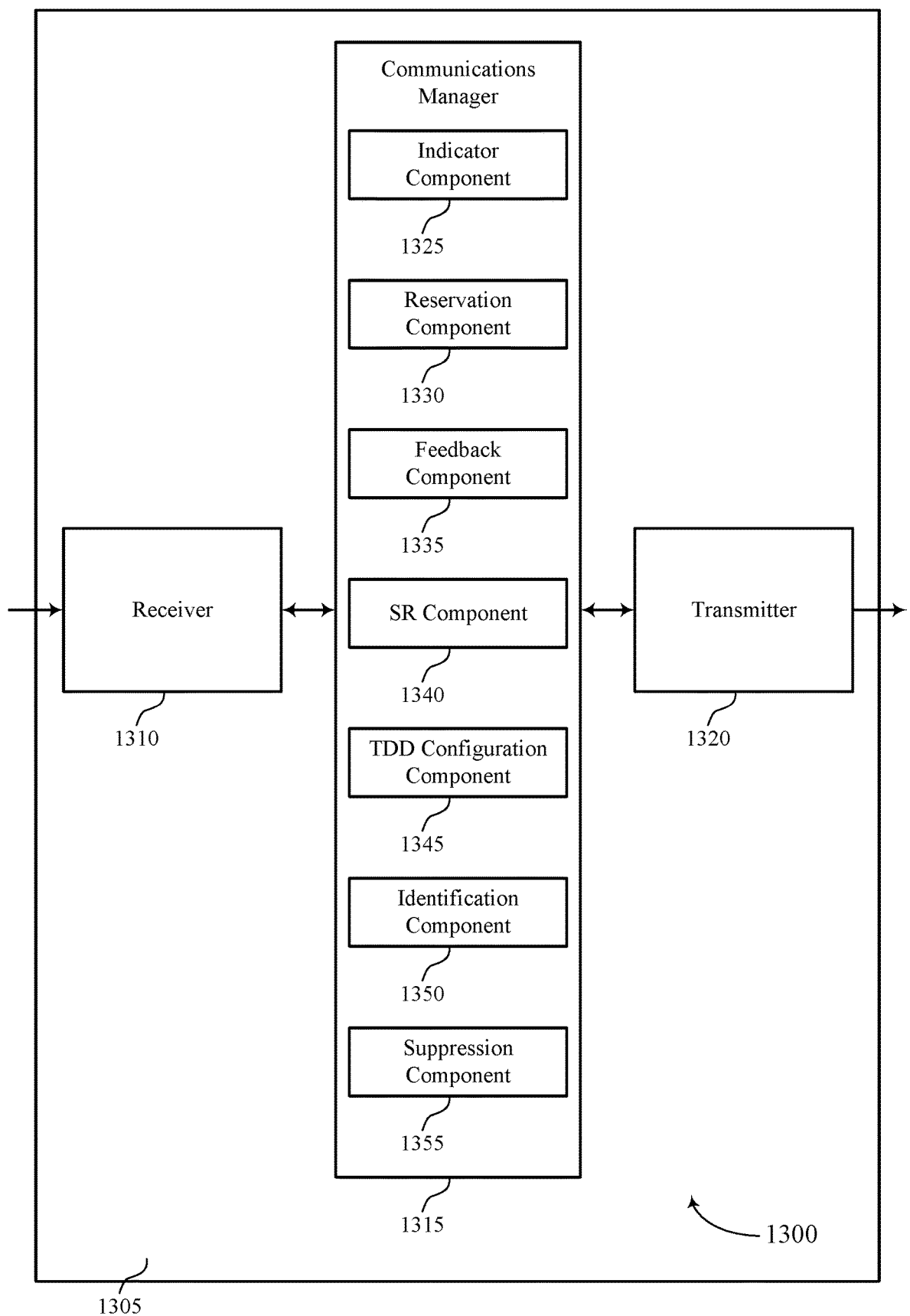

FIG. 13 shows a block diagram 1300 of a wireless device 1305 that supports signaling for multiplexing of low latency communication and sidelink communications in accordance with aspects of the present disclosure. Wireless device 1305 may be an example of aspects of a wireless device 1205 or a UE 115 as described with reference to FIG. 12. Wireless device 1305 may include receiver 1310, communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to signaling for multiplexing of low latency communication and sidelink communications, etc.). Information may be passed on to other components of the device. The receiver 1310 may be an example of aspects of the transceiver 1535 described with reference to FIG. 15. The receiver 1310 may utilize a single antenna or a set of antennas.

Communications manager 1315 may be an example of aspects of the communications manager 1515 described with reference to FIG. 15. Communications manager 1315 may also include indicator component 1325, reservation component 1330, feedback component 1335, SR component 1340, TDD configuration component 1345, identification component 1350, and suppression component 1355.

Indicator component 1325 may identify an indicator associated with wireless communications having a first duration TTI in a sidelink channel while performing D2D wireless communications in the sidelink channel using a second duration TTI, where the first duration TTI is shorter than the second duration TTI, monitor, during a first period, a downlink indication channel in each first duration TTI in a set of successive first TTIs for low latency communication information, identify an indicator associated with the wireless uplink communications, and receive a transmission failure indicator in response to transmitting the low latency communication. In some cases, the indicator includes a presence of low latency communication traffic, a location of a low latency communication UE, other information associated with low latency communication, or a combination thereof. In some cases, the downlink wireless communication having the first duration TTI includes low latency communication data.

Reservation component 1330 may receive a downlink wireless communication having the first duration TTI, where the downlink wireless communication is received according to a FDD configuration, reserve the dedicated uplink resources for a transmission of ACK/NACK feedback to a base station, reserve the dedicated uplink resources for a transmission of SRs for wireless uplink communications having the first duration TTI, reserve the dedicated uplink resources includes emptying at least one resource of scheduled sidelink data transmissions, determine whether a traffic profile of low latency communication during the first period is above a threshold based on the monitoring, where reserving the dedicated uplink resources for transmitting ACK/NACK feedback includes reserving the dedicated uplink resources using a first mode or a second mode based on the determination, and reserve the dedicated resources for transmissions having the first TTI. In some cases, the dedicated uplink resources include a resource in a subset of the first duration TTIs in a set of successive first TTIs. In some cases, the subset of the first duration TTIs is a single first duration TTI in the set of successive first TTIs. In some cases, the first mode includes reserving a resource in each first duration TTI in the set of successive first TTIs. In some cases, the second mode includes reserving a resource in a next first duration TTI in the set of successive first TTIs. In some cases, the dedicated uplink resources include a resource in each first duration TTI in a set of successive first TTIs. In some cases, the dedicated uplink resources include a resource in each first duration TTI in a set of successive first TTIs. In some cases, the dedicated uplink resources include a resource in a subset of the first duration TTIs in a set of successive first TTIs. In some cases, the transmission failure indicator and the scheduling grant are received during the same transmission. In some cases, a traffic profile of low latency communication includes at least one of the group including a traffic rate, a traffic level of reliability requirement, and an amount of URLLC traffic during a period of time.

Feedback component 1335 may identify dedicated uplink resources for acknowledgement/negative acknowledgment (ACK/NACK) feedback based on identifying the indicator, receiving the downlink wireless communication, or both, perform wireless uplink communications having a first duration TTI in a sidelink channel, the sidelink channel also configured for wireless communications having a second duration TTI, where the first duration TTI is shorter than the second duration TTI, and identify dedicated uplink resources for scheduling requests (SRs) for wireless uplink communications having the first duration TTI in the sidelink channel.

SR component 1340 may transmit a SR to a base station using the dedicated uplink resources in the sidelink channel.

TDD configuration component 1345 may receive a downlink wireless communication according to a TDD configuration, determine that low latency communications will utilize two or less first duration TTIs, determine that low latency communications will utilize more than two first duration TTIs, where identifying the indicator is based on the determining, determine whether low latency traffic is uplink traffic or downlink traffic, based on the identified TDD pattern, and resume sidelink communications on the sidelink channel after performing the one or more low latency transmissions. In some cases, the downlink wireless communication is received in a downlink control channel of a frame, a subframe, or a slot corresponding to the dedicated resources.

Identification component 1350 may identify scheduled gaps in the sidelink channel, where identifying the dedicated resources is based on the identified scheduled gaps, identify dedicated resources for transmission having a first duration TTI in a sidelink channel based on receiving the downlink wireless communication, where the sidelink channel is for performing D2D wireless communications using a second duration TTI, and where the first duration TTI is shorter than the second duration TTI, determine whether low latency traffic is uplink traffic or downlink traffic, based on the identified TDD pattern, identify an indicator associated with wireless communications having a first duration TTI in a sidelink channel while performing D2D wireless communications in a sidelink channel using a second duration TTI transmissions, where the first duration TTI is shorter than the second duration TTI, and identify dedicated resources in the sidelink channel for low latency communications based on identifying the indicator. In some cases, identifying dedicated resources includes: identifying a TDD pattern. In some cases, identifying dedicated resources includes: identifying a TDD pattern.

Suppression component 1355 may suspend sidelink communications in the sidelink channel during the identified resources.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
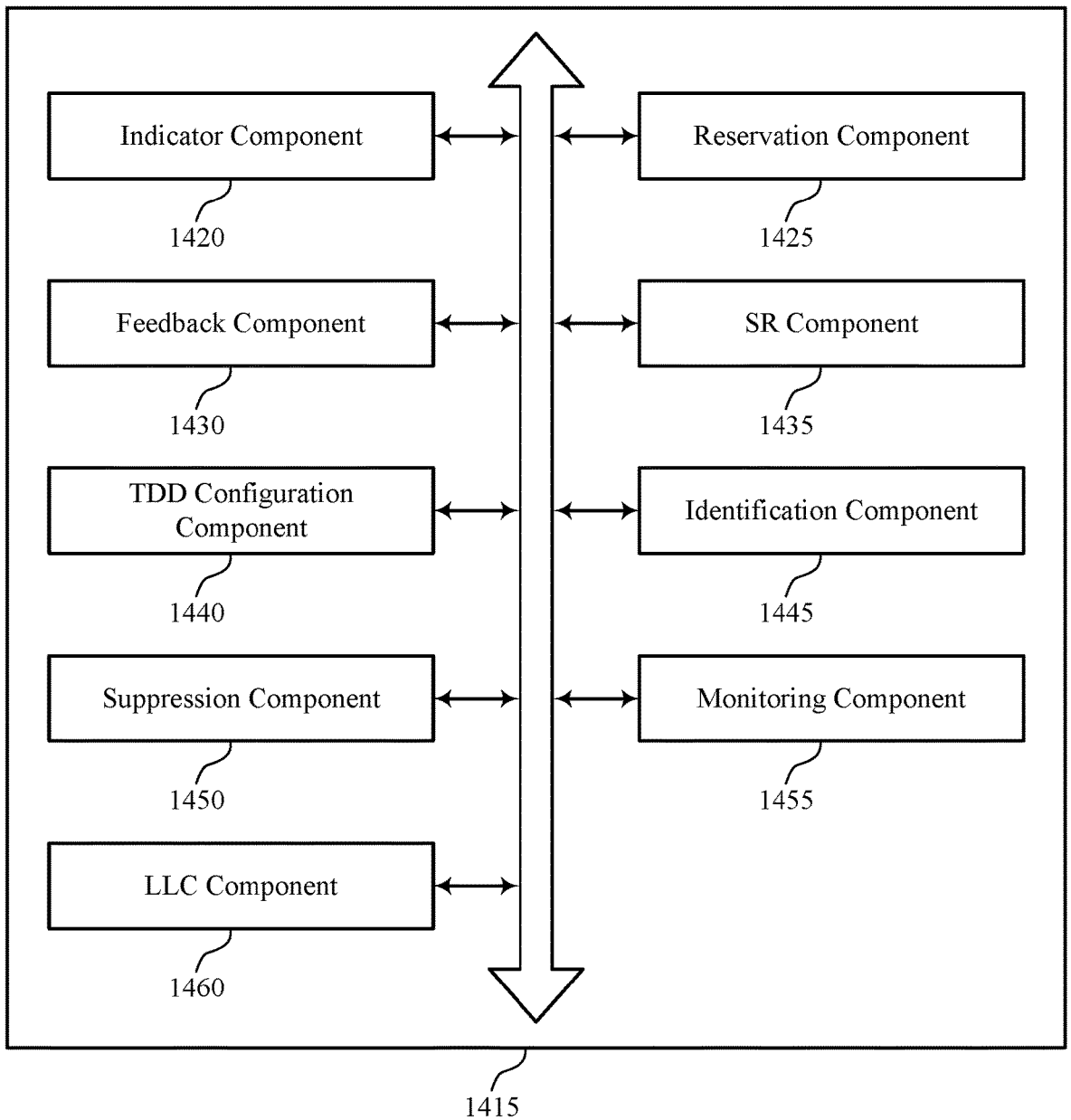

FIG. 14 shows a block diagram 1400 of a communications manager 1415 that supports signaling for multiplexing of low latency communication and sidelink communications in accordance with aspects of the present disclosure. The communications manager 1415 may be an example of aspects of a communications manager 1215, a communications manager 1315, or a communications manager 1515 described with reference to FIGS. 12, 13, and 15. The communications manager 1415 may include indicator component 1420, reservation component 1425, feedback component 1430, SR component 1435, TDD configuration component 1440, identification component 1445, suppression component 1450, monitoring component 1455, and LLC component 1460. Each of these modules may communicate, directly or indirectly, with one another (e.g., via one or more buses).

Indicator component 1420 may identify an indicator associated with wireless communications having a first duration TTI in a sidelink channel while performing D2D wireless communications in the sidelink channel using a second duration TTI, where the first duration TTI is shorter than the second duration TTI, monitor, during a first period, a downlink indication channel in each first duration TTI in a set of successive first TTIs for low latency communication information, identify an indicator associated with the wireless uplink communications, and receive a transmission failure indicator in response to transmitting the low latency communication. In some cases, the indicator includes a presence of low latency communication traffic, a location of a low latency communication UE, other information associated with low latency communication, or a combination thereof.

In some cases, the downlink wireless communication having the first duration TTI includes low latency communication data.

Reservation component 1425 may receive a downlink wireless communication having the first duration TTI, where the downlink wireless communication is received according to a FDD configuration, reserve the dedicated uplink resources for a transmission of ACK/NACK feedback to a base station, reserve the dedicated uplink resources for a transmission of SRs for wireless uplink communications having the first duration TTI, reserve the dedicated uplink resources includes emptying at least one resource of scheduled sidelink data transmissions, determine whether a traffic profile of low latency communication during the first period is above a threshold based on the monitoring, where reserving the dedicated uplink resources for transmitting ACK/NACK feedback includes reserving the dedicated uplink resources using a first mode or a second mode based on the determination, and reserve the dedicated resources for transmissions having the first TTI. In some cases, the dedicated uplink resources include a resource in a subset of the first duration TTIs in a set of successive first TTIs. In some cases, the subset of the first duration TTIs is a single first duration TTI in the set of successive first TTIs. In some cases, the first mode includes reserving a resource in each first duration TTI in the set of successive first TTIs. In some cases, the second mode includes reserving a resource in a next first duration TTI in the set of successive first TTIs. In some cases, the dedicated uplink resources include a resource in each first duration TTI in a set of successive first TTIs. In some cases, the dedicated uplink resources include a resource in each first duration TTI in a set of successive first TTIs. In some cases, the dedicated uplink resources include a resource in a subset of the first duration TTIs in a set of successive first TTIs. In some cases, the transmission failure indicator and the scheduling grant are received during the same transmission. In some cases, a traffic profile of low latency communication includes at least one of the group including a traffic rate, a traffic level of reliability requirement, and an amount of URLLC traffic during a period of time.

Feedback component 1430 may identify dedicated uplink resources for acknowledgement/negative acknowledgment (ACK/NACK) feedback based on identifying the indicator, receiving the downlink wireless communication, or both, perform wireless uplink communications having a first duration TTI in a sidelink channel, the sidelink channel also configured for wireless communications having a second duration TTI, where the first duration TTI is shorter than the second duration TTI, and identify dedicated uplink resources for scheduling requests (SRs) for wireless uplink communications having the first duration TTI in the sidelink channel.

SR component 1435 may transmit a SR to a base station using the dedicated uplink resources in the sidelink channel.

TDD configuration component 1440 may receive a downlink wireless communication according to a TDD configuration, determine that low latency communications will utilize two or less first duration TTIs, determine that low latency communications will utilize more than two first duration TTIs, where identifying the indicator is based on the determining, determine whether low latency traffic is uplink traffic or downlink traffic, based on the identified TDD pattern, and resume sidelink communications on the sidelink channel after performing the one or more low latency transmissions. In some cases, the downlink wireless communication is received in a downlink control channel of a frame, a subframe, or a slot corresponding to the dedicated resources.

Identification component 1445 may identify scheduled gaps in the sidelink channel, where identifying the dedicated resources is based on the identified scheduled gaps, identify dedicated resources for transmission having a first duration TTI in a sidelink channel based on receiving the downlink wireless communication, where the sidelink channel is for performing D2D wireless communications using a second duration TTI, and where the first duration TTI is shorter than the second duration TTI, determine whether low latency traffic is uplink traffic or downlink traffic, based on the identified TDD pattern, identify an indicator associated with wireless communications having a first duration TTI in a sidelink channel while performing D2D wireless communications in a sidelink channel using a second duration TTI transmissions, where the first duration TTI is shorter than the second duration TTI, and identify dedicated resources in the sidelink channel for low latency communications based on identifying the indicator. In some cases, identifying dedicated resources includes: identifying a TDD pattern. In some cases, identifying dedicated resources includes: identifying a TDD pattern.

Suppression component 1450 may suspend sidelink communications in the sidelink channel during the identified resources.

Monitoring component 1455 may monitor an indication channel in the set of successive first TTIs to identify a presence of low latency traffic, determine the subset based on monitoring the indication channel, monitor a downlink indication channel in each first duration TTI in a set of successive first TTIs, and detect a scheduling grant based on the monitoring.

LLC component 1460 may receive a scheduling grant in response to transmitting the SR to the base station, retransmit the low latency communication having the first duration TTI to the base station in the sidelink channel based on the scheduling grant, suspend sidelink communications in the sidelink channel during a single first duration TTI in the set of successive first TTIs based on detecting the scheduling grant, and perform one or more low latency transmissions on the identified resources in the sidelink channel. In some cases, performing the wireless uplink communications in the sidelink channel includes: transmitting a low latency communication having the first duration TTI to the base station before receiving a scheduling grant. In some cases, the single first duration TTI includes a next first duration TTI in the set of successive first TTIs.

Figure 15:
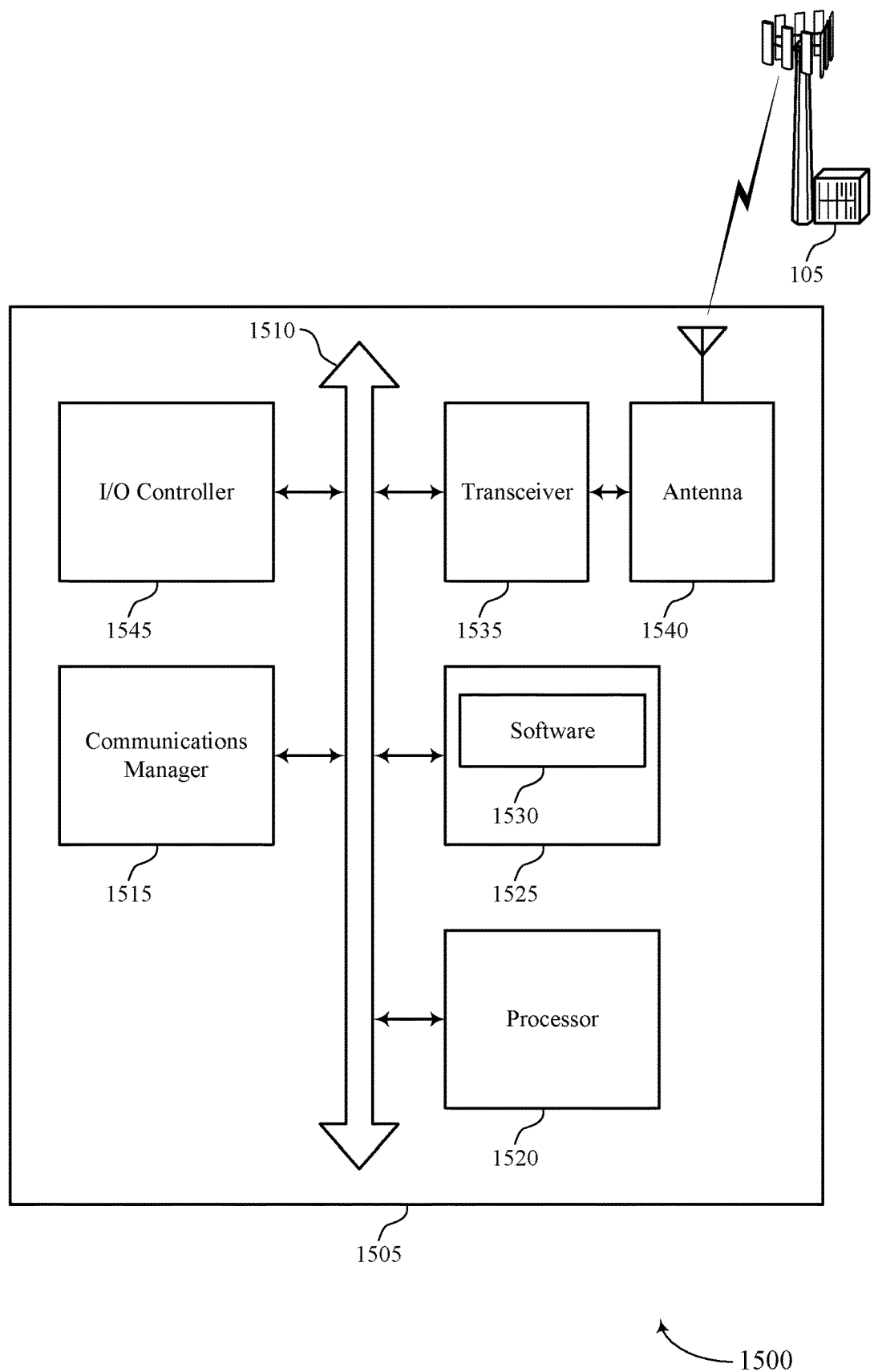
FIG. 15 illustrates a block diagram of a system including a UE that supports signaling for multiplexing of low latency communication and sidelink communications in accordance with aspects of the present disclosure.

FIG. 15 shows a diagram of a system 1500 including a device 1505 that supports signaling for multiplexing of low latency communication and sidelink communications in accordance with aspects of the present disclosure. Device 1505 may be an example of or include the components of wireless device 1205, wireless device 1305, or a UE 115 as described above, e.g., with reference to FIGS. 12 and 13. Device 1505 may include components for bi-directional voice and data communications including components for transmitting and receiving communications, including communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting signaling for multiplexing of low latency communication and sidelink communications).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support signaling for multiplexing of low latency communication and sidelink communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
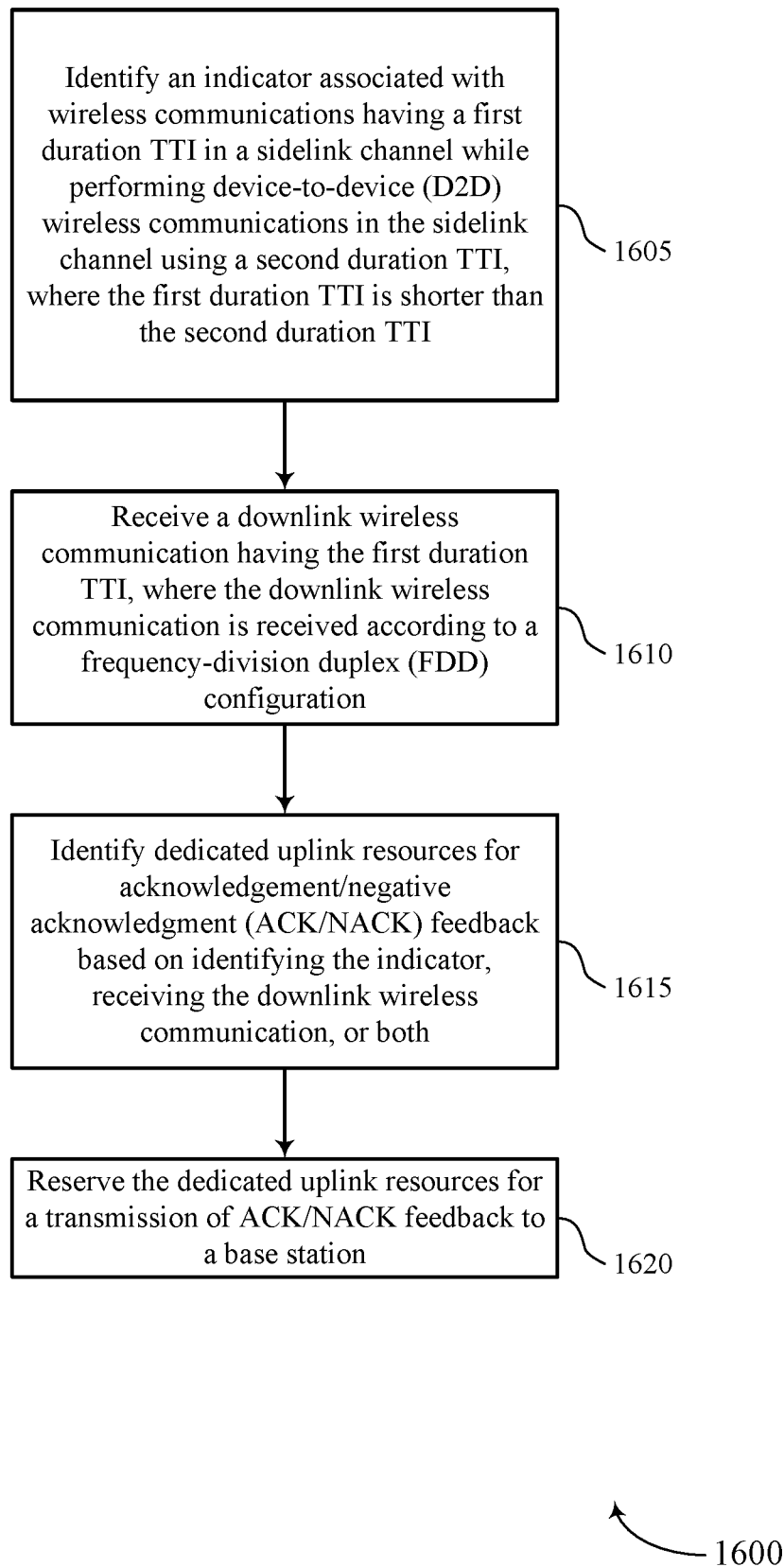
FIGS. 16 through 20 illustrate methods for signaling for multiplexing of low latency communication and sidelink communications in accordance with aspects of the present disclosure.

FIG. 16 shows a flowchart illustrating a method 1600 for signaling for multiplexing of low latency communication and sidelink communications in accordance with aspects of the present disclosure. The operations of method 1600 may be implemented by a UE 115 or its components as described herein. For example, the operations of method 1600 may be performed by a communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify an indicator associated with wireless communications having a first duration TTI in a sidelink channel while performing D2D wireless communications in the sidelink channel using a second duration TTI, wherein the first duration TTI is shorter than the second duration TTI. The operations of block 1605 may be performed according to the methods described herein. In certain examples, aspects of the operations of block 1605 may be performed by an indicator component as described with reference to FIGS. 12 through 15.

At block 1610 the UE 115 may receive a downlink wireless communication having the first duration TTI, wherein the downlink wireless communication is received according to a FDD configuration. The operations of block 1610 may be performed according to the methods described herein. In certain examples, aspects of the operations of block 1610 may be performed by a reservation component as described with reference to FIGS. 12 through 15.

At block 1615 the UE 115 may identify dedicated uplink resources for acknowledgement/negative acknowledgment (ACK/NACK) feedback based at least in part on identifying the indicator, receiving the downlink wireless communication, or both. The operations of block 1615 may be performed according to the methods described herein. In certain examples, aspects of the operations of block 1615 may be performed by a feedback component as described with reference to FIGS. 12 through 15.

At block 1620 the UE 115 may reserve the dedicated uplink resources for a transmission of ACK/NACK feedback to a base station. The operations of block 1620 may be performed according to the methods described herein. In certain examples, aspects of the operations of block 1620 may be performed by a reservation component as described with reference to FIGS. 12 through 15.

Figure 17:
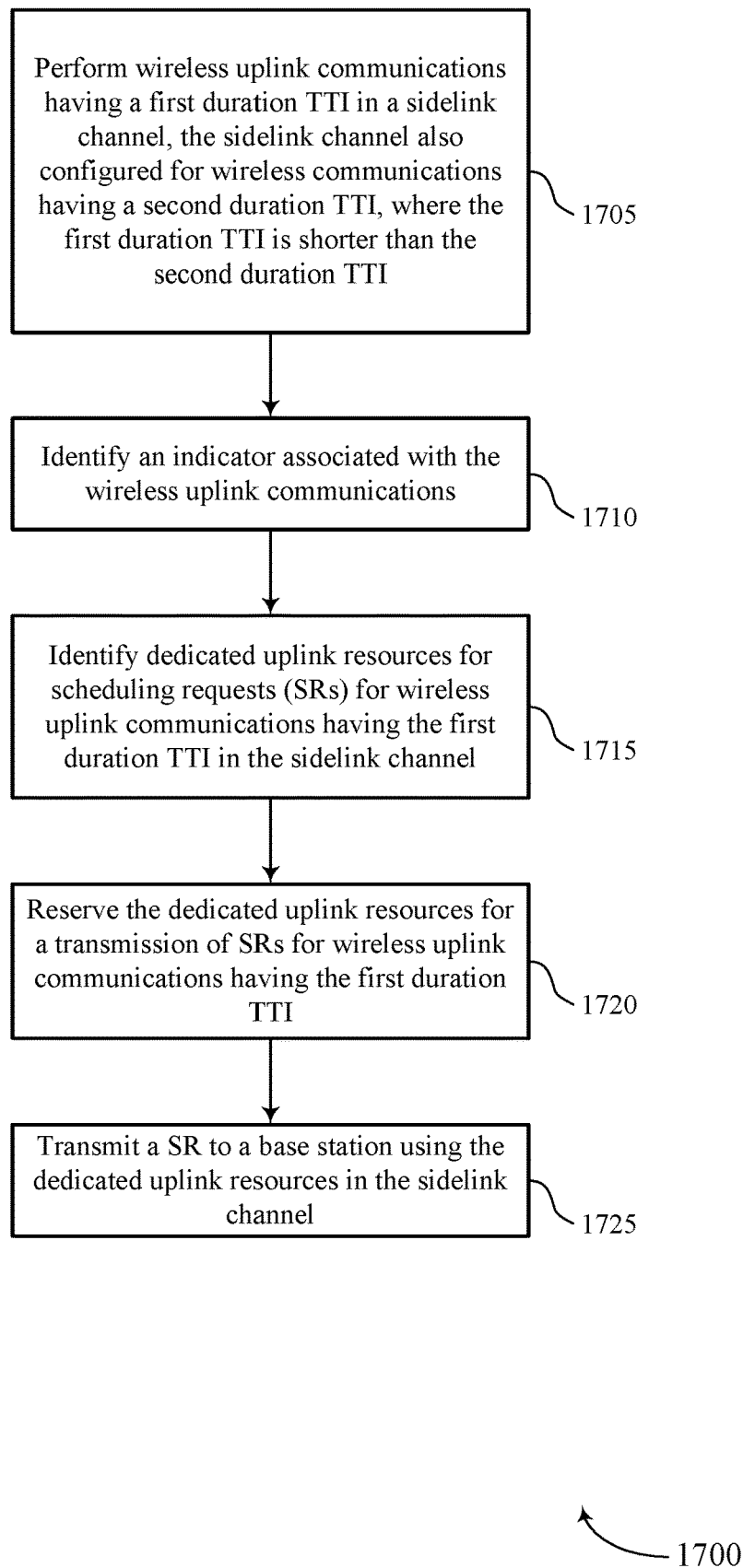

FIG. 17 shows a flowchart illustrating a method 1700 for signaling for multiplexing of low latency communication and sidelink communications in accordance with aspects of the present disclosure. The operations of method 1700 may be implemented by a UE 115 or its components as described herein. For example, the operations of method 1700 may be performed by a communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may perform wireless uplink communications having a first duration TTI in a sidelink channel, the sidelink channel also configured for wireless communications having a second duration TTI, wherein the first duration TTI is shorter than the second duration TTI. The operations of block 1705 may be performed according to the methods described herein. In certain examples, aspects of the operations of block 1705 may be performed by a feedback component as described with reference to FIGS. 12 through 15.

At block 1710 the UE 115 may identify an indicator associated with the wireless uplink communications. The operations of block 1710 may be performed according to the methods described herein. In certain examples, aspects of the operations of block 1710 may be performed by an indicator component as described with reference to FIGS. 12 through 15.

At block 1715 the UE 115 may identify dedicated uplink resources for scheduling requests (SRs) for wireless uplink communications having the first duration TTI in the sidelink channel. The operations of block 1715 may be performed according to the methods described herein. In certain examples, aspects of the operations of block 1715 may be performed by a feedback component as described with reference to FIGS. 12 through 15.

At block 1720 the UE 115 may reserve the dedicated uplink resources for a transmission of SRs for wireless uplink communications having the first duration TTI. The operations of block 1720 may be performed according to the methods described herein. In certain examples, aspects of the operations of block 1720 may be performed by a reservation component as described with reference to FIGS. 12 through 15.

At block 1725 the UE 115 may transmit a SR to a base station using the dedicated uplink resources in the sidelink channel. The operations of block 1725 may be performed according to the methods described herein. In certain examples, aspects of the operations of block 1725 may be performed by a SR component as described with reference to FIGS. 12 through 15.

Figure 18:
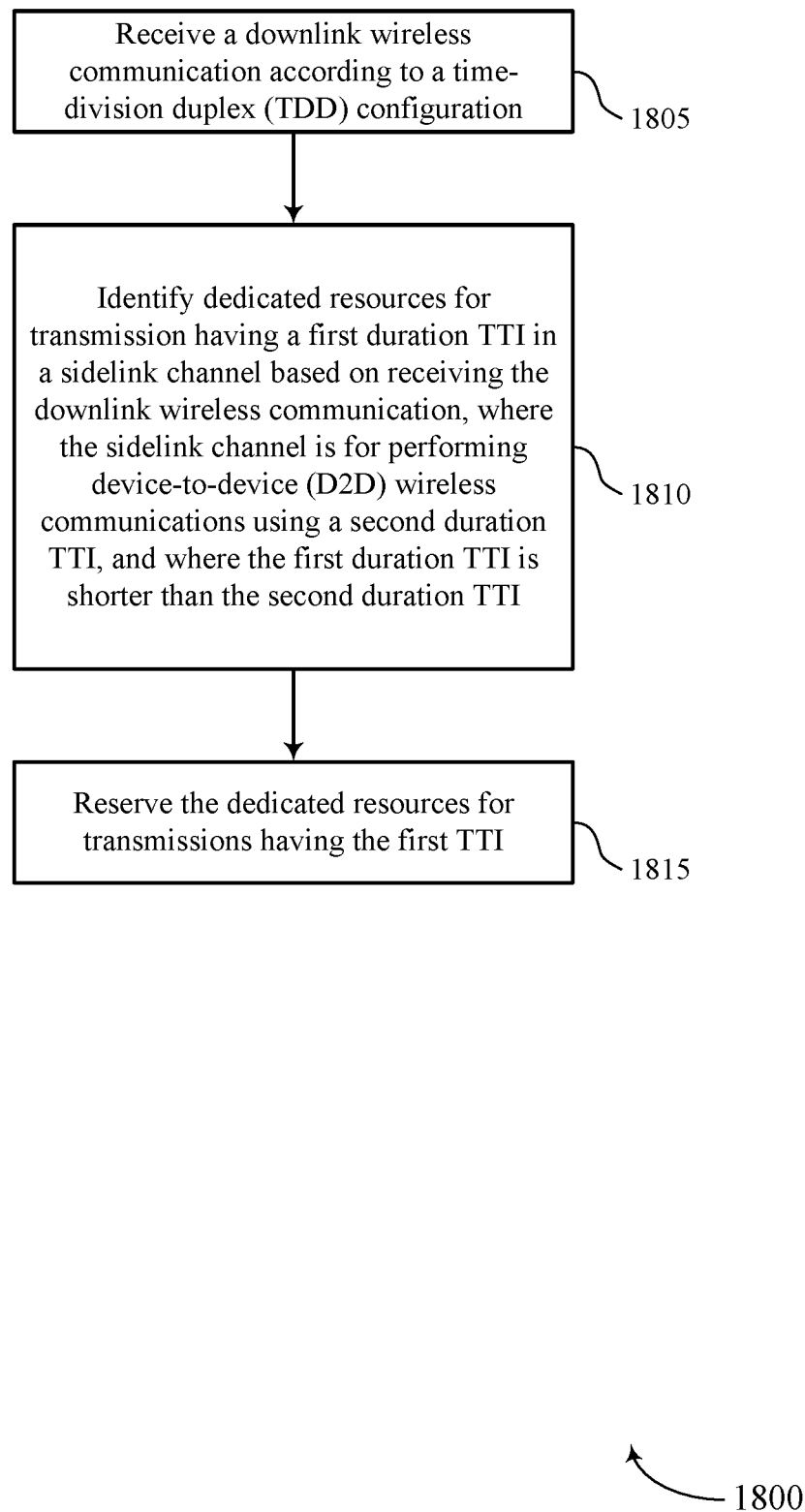

FIG. 18 shows a flowchart illustrating a method 1800 for signaling for multiplexing of low latency communication and sidelink communications in accordance with aspects of the present disclosure. The operations of method 1800 may be implemented by a UE 115 or its components as described herein. For example, the operations of method 1800 may be performed by a communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a downlink wireless communication according to a TDD configuration. The operations of block 1805 may be performed according to the methods described herein. In certain examples, aspects of the operations of block 1805 may be performed by a TDD configuration component as described with reference to FIGS. 12 through 15.

At block 1810 the UE 115 may identify dedicated resources for transmission having a first duration TTI in a sidelink channel based at least in part on receiving the downlink wireless communication, wherein the sidelink channel is for performing D2D wireless communications using a second duration TTI, and wherein the first duration TTI is shorter than the second duration TTI. The operations of block 1810 may be performed according to the methods described herein. In certain examples, aspects of the operations of block 1810 may be performed by an identification component as described with reference to FIGS. 12 through 15.

At block 1815 the UE 115 may reserve the dedicated resources for transmissions having the first TTI. The operations of block 1815 may be performed according to the methods described herein. In certain examples, aspects of the operations of block 1815 may be performed by a reservation component as described with reference to FIGS. 12 through 15.

Figure 19:
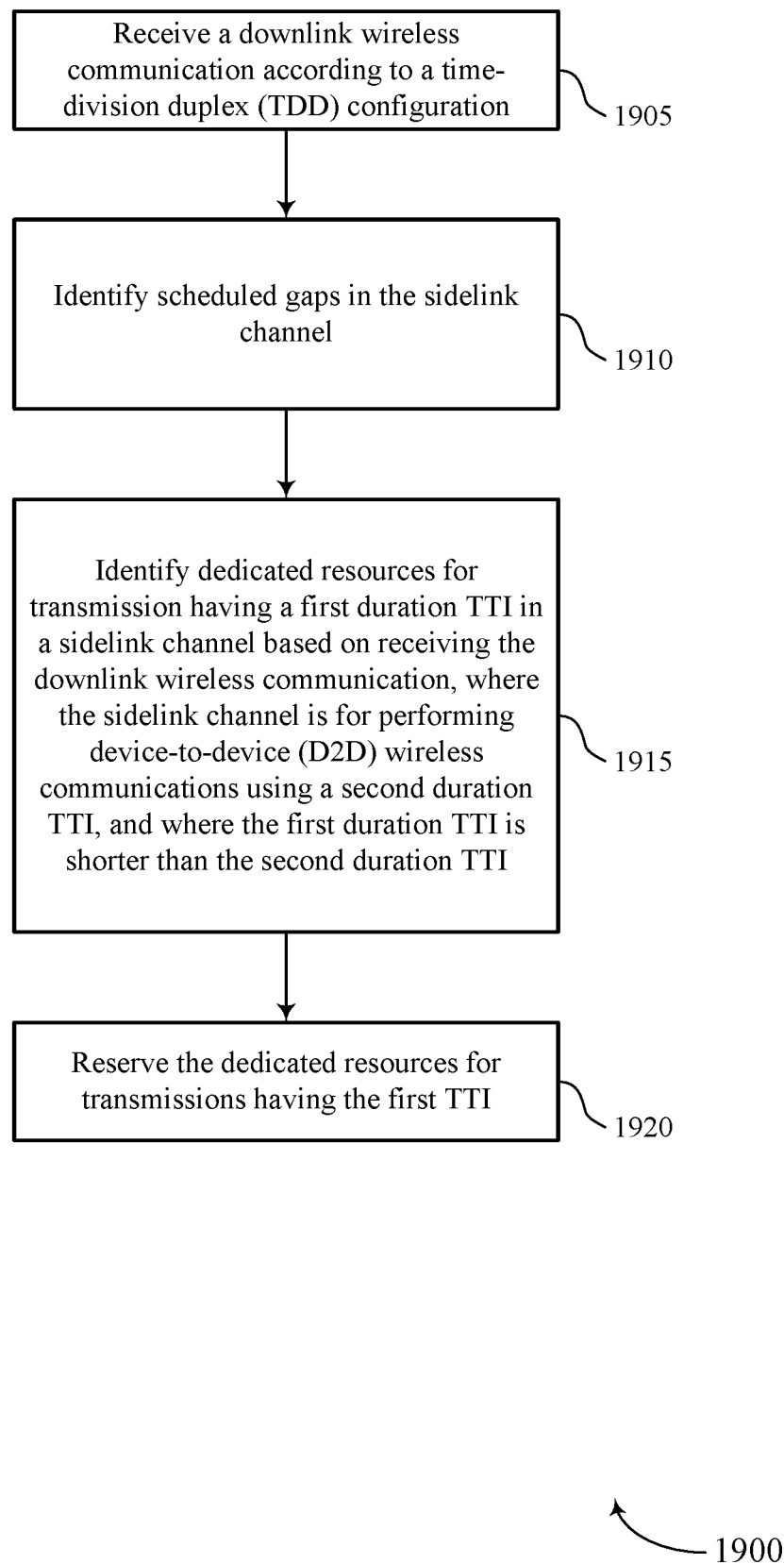

FIG. 19 shows a flowchart illustrating a method 1900 for signaling for multiplexing of low latency communication and sidelink communications in accordance with aspects of the present disclosure. The operations of method 1900 may be implemented by a UE 115 or its components as described herein. For example, the operations of method 1900 may be performed by a communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a downlink wireless communication according to a TDD configuration. The operations of block 1905 may be performed according to the methods described herein. In certain examples, aspects of the operations of block 1905 may be performed by a TDD configuration component as described with reference to FIGS. 12 through 15.

At block 1910 the UE 115 may identify scheduled gaps in the sidelink channel, wherein identifying the dedicated resources is based at least in part on the identified scheduled gaps. The operations of block 1910 may be performed according to the methods described herein. In certain examples, aspects of the operations of block 1910 may be performed by an identification component as described with reference to FIGS. 12 through 15.

At block 1915 the UE 115 may identify dedicated resources for transmission having a first duration TTI in a sidelink channel based at least in part on receiving the downlink wireless communication, wherein the sidelink channel is for performing D2D wireless communications using a second duration TTI, and wherein the first duration TTI is shorter than the second duration TTI. The operations of block 1915 may be performed according to the methods described herein. In certain examples, aspects of the operations of block 1915 may be performed by an identification component as described with reference to FIGS. 12 through 15.

At block 1920 the UE 115 may reserve the dedicated resources for transmissions having the first TTI. The operations of block 1920 may be performed according to the methods described herein. In certain examples, aspects of the operations of block 1920 may be performed by a reservation component as described with reference to FIGS. 12 through 15.

Figure 20:
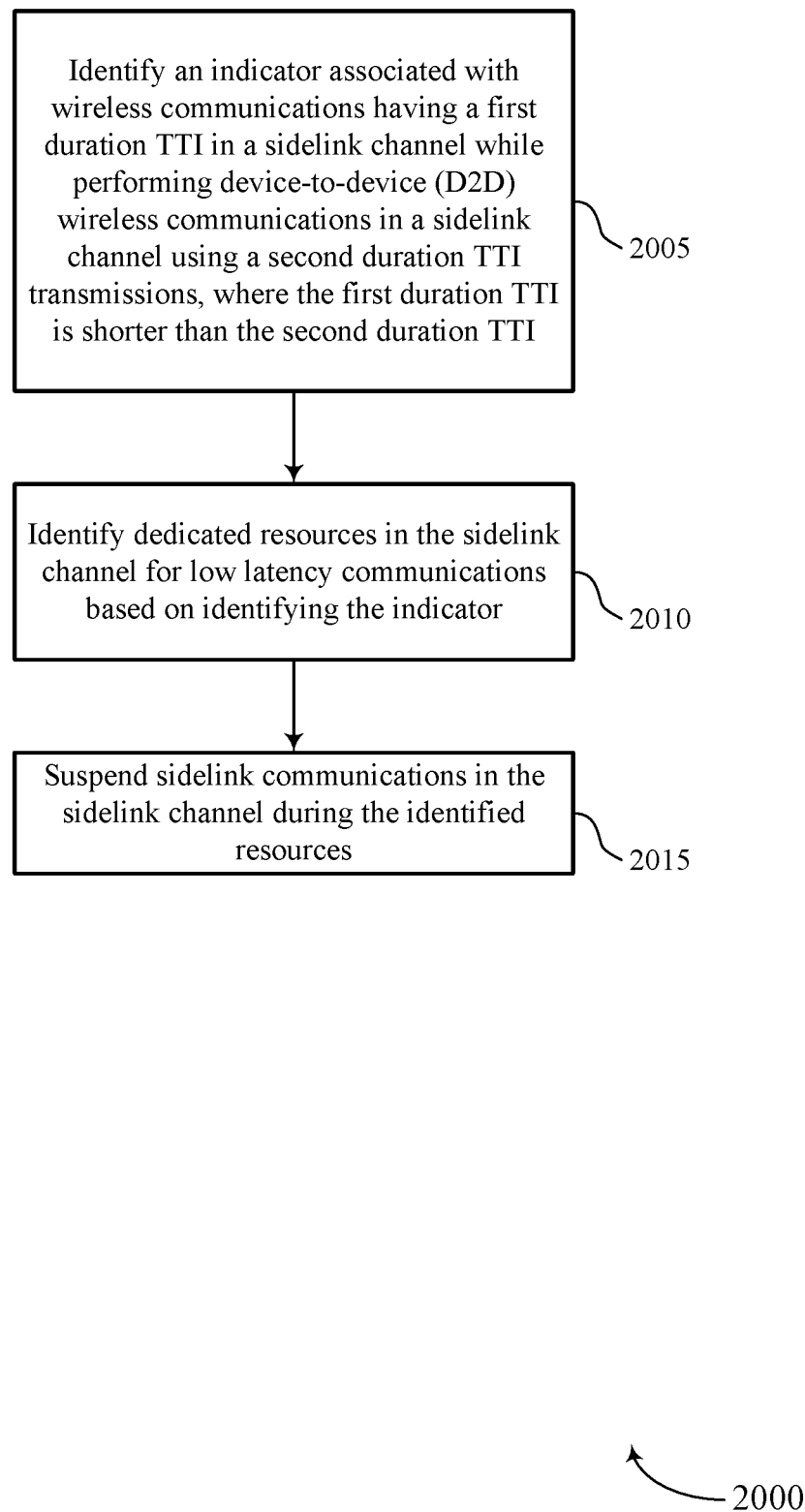

FIG. 20 shows a flowchart illustrating a method 2000 for signaling for multiplexing of low latency communication and sidelink communications in accordance with aspects of the present disclosure. The operations of method 2000 may be implemented by a UE 115 or its components as described herein. For example, the operations of method 2000 may be performed by a communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify an indicator associated with wireless communications having a first duration TTI in a sidelink channel while performing D2D wireless communications in a sidelink channel using a second duration TTI transmissions, wherein the first duration TTI is shorter than the second duration TTI. The operations of block 2005 may be performed according to the methods described herein. In certain examples, aspects of the operations of block 2005 may be performed by an identification component as described with reference to FIGS. 12 through 15.

At block 2010 the UE 115 may identify dedicated resources in the sidelink channel for low latency communications based at least in part on identifying the indicator. The operations of block 2010 may be performed according to the methods described herein. In certain examples, aspects of the operations of block 2010 may be performed by an identification component as described with reference to FIGS. 12 through 15.

At block 2015 the UE 115 may suspend sidelink communications in the sidelink channel during the identified resources. The operations of block 2015 may be performed according to the methods described herein. In certain examples, aspects of the operations of block 2015 may be performed by a suppression component as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying an indicator associated with wireless communications having a first transmission time interval (TTI) duration in a sidelink channel while performing device-to-device (D2D) wireless communications in the sidelink channel using a second TTI duration, wherein the first TTI duration is shorter than the second TTI duration;
identifying dedicated uplink resources for scheduling requests (SRs) for wireless uplink communications having the first TTI duration in the sidelink channel;
reserving the dedicated uplink resources for a transmission of SRs for wireless uplink communications having the first TTI duration in the sidelink channel;
monitoring a downlink indication channel in each TTI having the first TTI duration in a plurality of successive first TTIs;
detecting a scheduling grant based on the monitoring; and
suspending the D2D wireless communication in the sidelink channel during a single TTI having the first TTI duration in the plurality of successive first TTIs based on detecting the scheduling grant.

2. The method of claim 1, wherein the dedicated uplink resources comprise a resource in each TTI having the first TTI duration in a plurality of successive first TTIs.

3. The method of claim 1, wherein the dedicated uplink resources comprise a resource in a subset of TTIs having the first TTI duration in a plurality of successive first TTIs.

4. The method of claim 1, wherein the single TTI having the first TTI duration comprises a next TTI having the first TTI duration in the plurality of successive first TTIs.

5. An apparatus for wireless communication at a user equipment (UE), comprising:
a processor,
memory coupled with the processor; and
instructions stored in the memory and executable by the processor to cause the apparatus to:
identify an indicator associated with wireless communications having a first transmission time interval (TTI) duration in a sidelink channel while performing device-to-device (D2D) wireless communications in the sidelink channel using a second TTI duration, wherein the first TTI duration is shorter than the second TTI duration;
identify dedicated uplink resources for scheduling requests (SRs) for wireless uplink communications having the first TTI duration in the sidelink channel;
reserve the dedicated uplink resources for a transmission of SRs for wireless uplink communications having the first TTI duration in the sidelink channel;
monitor a downlink indication channel in each TTI having the first TTI duration in a plurality of successive first TTIs;
detect a scheduling grant based on the monitoring; and
suspend the D2D wireless communication in the sidelink channel during a single TTI having the first TTI duration in the plurality of successive first TTIs based on detecting the scheduling grant.

6. The apparatus of claim 5, wherein the dedicated uplink resources comprise a resource in each TTI having the first TTI duration in a plurality of successive first TTIs.

7. The apparatus of claim 5, wherein the dedicated uplink resources comprise a resource in a subset of TTIs having the first TTI duration in a plurality of successive first TTIs.

8. The apparatus of claim 5, wherein the single TTI having the first TTI duration comprises a next TTI having the first TTI duration in the plurality of successive first TTIs.

9. An apparatus for wireless communication at a user equipment (UE), comprising:
means for identifying an indicator associated with wireless communications having a first transmission time interval (TTI) duration in a sidelink channel while performing device-to-device (D2D) wireless communications in the sidelink channel using a second TTI duration, wherein the first TTI duration is shorter than the second TTI duration;
means for identifying dedicated uplink resources for scheduling requests (SRs) for wireless uplink communications having the first TTI duration in the sidelink channel;
means for reserving the dedicated uplink resources for a transmission of SRs for wireless uplink communications having the first TTI duration in the sidelink channel;
means for monitoring a downlink indication channel in each TTI having the first TTI duration in a plurality of successive first TTIs;
means for detecting a scheduling grant based on the monitoring; and
means for suspending the D2D wireless communication in the sidelink channel during a single TTI having the first TTI duration in the plurality of successive first TTIs based on detecting the scheduling grant.

10. The apparatus of claim 9, wherein the dedicated uplink resources comprise a resource in each TTI having the first TTI duration in a plurality of successive first TTIs.

11. The apparatus of claim 9, wherein the dedicated uplink resources comprise a resource in a subset of TTIs having the first TTI duration in a plurality of successive first TTIs.

12. The apparatus of claim 9, wherein the single TTI having the first TTI duration comprises a next TTI having the first TTI duration in the plurality of successive first TTIs.

13. A non-transitory computer-readable medium storing code for wireless communication at a user equipment (UE), the code comprising instructions executable by a processor to:
identify an indicator associated with wireless communications having a first transmission time interval (TTI) duration in a sidelink channel while performing device-to-device (D2D) wireless communications in the sidelink channel using a second TTI duration, wherein the first TTI duration is shorter than the second TTI duration;
identify dedicated uplink resources for scheduling requests (SRs) for wireless uplink communications having the first TTI duration in the sidelink channel;
reserve the dedicated uplink resources for a transmission of SRs for wireless uplink communications having the first TTI duration in the sidelink channel;
monitor a downlink indication channel in each TTI having the first TTI duration in a plurality of successive first TTIs;
detect a scheduling grant based on the monitoring; and
suspend the D2D wireless communication in the sidelink channel during a single TTI having the first TTI duration in the plurality of successive first TTIs based on detecting the scheduling grant.

14. The non-transitory computer-readable medium of claim 13, wherein the dedicated uplink resources comprise a resource in each TTI having the first TTI duration in a plurality of successive first TTIs.

15. The non-transitory computer-readable medium of claim 13, wherein the dedicated uplink resources comprise a resource in a subset of TTIs having the first TTI duration in a plurality of successive first TTIs.

16. The non-transitory computer-readable medium of claim 13, wherein the single TTI having the first TTI duration comprises a next TTI having the first TTI duration in the plurality of successive first TTIs.

* * * * *